United States Patent
Rosen et al.

(10) Patent No.: US 11,335,937 B2
(45) Date of Patent: May 17, 2022

(54) OPERATION OF MOLTEN CARBONATE FUEL CELLS WITH HIGH ELECTROLYTE FILL LEVEL

(71) Applicants: EXXONMOBIL RESEARCH AND ENGINEERING COMPANY, ANNANDALE, NJ (US); FUELCELL ENERGY, INC., DANBURY, CT (US)

(72) Inventors: Jonathan Rosen, Morristown, NJ (US); Heather A. Elsen, Bethlehem, PA (US); Gabor Kiss, Hampton, NJ (US); William A. Lamberti, Stewartsville, NJ (US); William C. Horn, Long Valley, NJ (US); Anding Zhang, Short Hills, NJ (US); Timothy C. Geary, Stamford, CT (US); Adam Franco, Newtown, CT (US); Abdelkader Hilmi, Bethel, CT (US)

(73) Assignees: EXXONMOBIL RESEARCH AND ENGINEERING COMPANY, Annandale, NJ (US); FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 16/695,356

(22) Filed: Nov. 26, 2019

(65) Prior Publication Data

US 2021/0159531 A1     May 27, 2021

(51) Int. Cl.
*H01M 8/14*     (2006.01)
*H01M 8/0202*     (2016.01)
(Continued)

(52) U.S. Cl.
CPC ......... *H01M 8/142* (2013.01); *H01M 8/0202* (2013.01); *H01M 8/0289* (2013.01);
(Continued)

(58) Field of Classification Search
CPC ............ H01M 8/0289; H01M 8/0293; H01M 8/0295; H01M 8/142; H01M 8/145;
(Continued)

(56) References Cited

U.S. PATENT DOCUMENTS

| 3,615,839 A | 10/1971 | Thompson et al. |
| 3,970,474 A | 7/1976 | Anbar et al. |

(Continued)

FOREIGN PATENT DOCUMENTS

| CA | 2120858 A1 | 10/1994 |
| CA | 2325072 A1 | 4/2002 |

(Continued)

OTHER PUBLICATIONS

Campanari et al., "Using MCFC for high efficiency CO2 capture from natural gas combined cycles: Comparison of internal and external reforming," Feb. 20, 2013, Applied Energy, 112, 772-783. (Year: 2013).*

(Continued)

*Primary Examiner* — Matthew W Van Oudenaren
(74) *Attorney, Agent, or Firm* — Shook, Hardy & Bacon LLP

(57) ABSTRACT

An elevated target amount of electrolyte is used to initially fill a molten carbonate fuel cell that is operated under carbon capture conditions. The increased target electrolyte fill level can be achieved in part by adding additional electrolyte to the cathode collector prior to start of operation. The increased target electrolyte fill level can provide improved fuel cell performance and lifetime when operating a molten carbonate fuel cell at high current density with a low-$CO_2$ content cathode input stream and/or when operating a molten carbonate fuel cell at high $CO_2$ utilization.

9 Claims, 6 Drawing Sheets

(51) Int. Cl.
*H01M 8/0289* (2016.01)
*H01M 8/04276* (2016.01)
*H01M 8/04858* (2016.01)
*H01M 8/0612* (2016.01)
*H01M 8/0295* (2016.01)

(52) U.S. Cl.
CPC ... *H01M 8/04283* (2013.01); *H01M 8/04902* (2013.01); *H01M 8/0618* (2013.01); *H01M 8/145* (2013.01); *H01M 8/0295* (2013.01); *H01M 2008/147* (2013.01); *H01M 2300/0051* (2013.01)

(58) Field of Classification Search
CPC ............ H01M 8/04283; H01M 8/0681; H01M 8/04455; H01M 8/04477; H01M 8/04544; H01M 8/04552; H01M 8/04559; H01M 8/04574; H01M 8/04582; H01M 8/04589; H01M 8/04798; H01M 8/0482; H01M 8/04865; H01M 8/04873; H01M 8/0488; H01M 8/04895; H01M 8/04902; H01M 8/0491; H01M 2008/147; H01M 2300/0051
See application file for complete search history.

(56) References Cited

U.S. PATENT DOCUMENTS

| | | | |
|---|---|---|---|
| 4,041,210 A | 8/1977 | Van Dine | |
| 4,160,663 A | 7/1979 | Hsieh | |
| 4,772,634 A | 9/1988 | Farooque | |
| 4,800,052 A | 1/1989 | Swarr et al. | |
| 4,810,595 A | 3/1989 | Kahara et al. | |
| 4,917,971 A | 4/1990 | Farooque | |
| 4,921,765 A | 5/1990 | Gmeindl et al. | |
| 4,995,807 A | 2/1991 | Rampley et al. | |
| 5,039,579 A | 8/1991 | Kinoshita | |
| 5,071,719 A | 12/1991 | Rostrup-Nielsen et al. | |
| 5,079,103 A | 1/1992 | Schramm | |
| 5,082,752 A | 1/1992 | Koga et al. | |
| 5,084,362 A | 1/1992 | Farooque | |
| 5,134,043 A | 7/1992 | Nakazawa | |
| 5,169,717 A | 12/1992 | Topsoe | |
| 5,198,311 A | 3/1993 | Nakazawa et al. | |
| 5,208,113 A | 5/1993 | Kinoshita | |
| 5,232,793 A | 8/1993 | Miyauchi et al. | |
| 5,376,472 A | 12/1994 | Hartvigsen et al. | |
| 5,380,600 A | 1/1995 | Hansen et al. | |
| 5,413,878 A | 5/1995 | Williams et al. | |
| 5,417,051 A | 5/1995 | Ankersmit et al. | |
| 5,422,195 A | 6/1995 | Bernard | |
| 5,468,573 A | 11/1995 | Bregoli et al. | |
| 5,470,670 A | 11/1995 | Yasumoto et al. | |
| 5,518,827 A | 5/1996 | Matsumura et al. | |
| 5,541,014 A | 7/1996 | Micheli et al. | |
| 5,554,453 A | 9/1996 | Steinfeld et al. | |
| 5,616,430 A | 4/1997 | Aoyama | |
| 5,688,292 A | 11/1997 | Antolini | |
| 5,736,026 A | 4/1998 | Patel et al. | |
| 5,833,734 A | 11/1998 | Cip et al. | |
| 6,030,718 A | 2/2000 | Fuglevand et al. | |
| 6,063,141 A | 5/2000 | Wendt et al. | |
| 6,083,636 A | 7/2000 | Hsu | |
| 6,090,312 A | 7/2000 | Ziaka et al. | |
| 6,126,718 A | 10/2000 | Sawa et al. | |
| 6,162,556 A | 12/2000 | Vollmar et al. | |
| 6,267,799 B1 | 7/2001 | Innes et al. | |
| 6,322,916 B1 | 11/2001 | Hemmes et al. | |
| 6,365,290 B1 | 4/2002 | Ghezel-Ayagh et al. | |
| 6,383,251 B1 | 5/2002 | Sherwood | |
| 6,383,677 B1 | 5/2002 | Allen | |
| 6,420,062 B1 | 7/2002 | Prohaska et al. | |
| 6,492,045 B1 | 12/2002 | Blanchet et al. | |
| 6,509,113 B2 | 1/2003 | Keegan | |
| 6,524,356 B2 | 2/2003 | Fournier et al. | |
| 6,648,942 B2 | 11/2003 | Hoffman et al. | |
| 6,896,988 B2 | 5/2005 | Wang et al. | |
| 7,311,986 B2 | 12/2007 | Hsu | |
| 7,396,603 B2 | 7/2008 | Farooque et al. | |
| 7,503,178 B2 | 3/2009 | Bucker et al. | |
| 7,563,527 B2 | 7/2009 | Tanaka et al. | |
| 7,862,938 B2 | 1/2011 | Ghezel-Ayagh | |
| 7,914,765 B2 | 3/2011 | McLean et al. | |
| 7,939,219 B2 | 5/2011 | Johnsen et al. | |
| 8,047,007 B2 | 11/2011 | Zubrin et al. | |
| 8,080,344 B2 | 12/2011 | Skok et al. | |
| 8,142,943 B2 | 3/2012 | McElroy et al. | |
| 8,349,504 B1 | 1/2013 | Radovich | |
| 8,557,468 B2 | 10/2013 | Hilmi et al. | |
| 8,562,903 B2 | 10/2013 | Hayton et al. | |
| 8,802,332 B2 | 8/2014 | Correa et al. | |
| 8,822,090 B2 | 9/2014 | Ma et al. | |
| 9,077,007 B2 | 7/2015 | Berlowitz et al. | |
| 2002/0106549 A1 | 8/2002 | Cooper et al. | |
| 2002/0142208 A1 | 10/2002 | Keefer et al. | |
| 2003/0008183 A1 | 1/2003 | Hsu | |
| 2003/0096155 A1 | 5/2003 | Hong et al. | |
| 2003/0143448 A1 | 7/2003 | Keefer | |
| 2004/0038089 A1 | 2/2004 | Hoffjann et al. | |
| 2004/0038115 A1 | 2/2004 | Johnsen et al. | |
| 2004/0043274 A1 | 3/2004 | Scartozzi et al. | |
| 2004/0202914 A1 | 10/2004 | Sridhar et al. | |
| 2005/0079395 A1 | 4/2005 | Varatharajan et al. | |
| 2005/0106429 A1 | 5/2005 | Keefer | |
| 2005/0112425 A1 | 5/2005 | Hsu | |
| 2005/0123810 A1 | 6/2005 | Balan | |
| 2005/0164051 A1 | 7/2005 | Venkataraman et al. | |
| 2005/0181247 A1 | 8/2005 | Foger et al. | |
| 2006/0127718 A1 | 6/2006 | Kurashima et al. | |
| 2006/0159967 A1 | 7/2006 | Huijsmans et al. | |
| 2006/0204806 A1 | 9/2006 | Takada et al. | |
| 2006/0251940 A1 | 11/2006 | Bandhauer et al. | |
| 2006/0269830 A1* | 11/2006 | Johnsen ............... H01M 8/142 429/442 |
| 2007/0017367 A1 | 1/2007 | McElroy et al. | |
| 2007/0072027 A1 | 3/2007 | Sridhar et al. | |
| 2007/0099038 A1 | 5/2007 | Galloway | |
| 2007/0184310 A1 | 8/2007 | Kim et al. | |
| 2007/0224467 A1 | 9/2007 | Nervi et al. | |
| 2007/0287046 A1 | 12/2007 | Koda et al. | |
| 2008/0057361 A1 | 3/2008 | Moon et al. | |
| 2008/0124255 A1 | 5/2008 | Johnston | |
| 2008/0160358 A1 | 7/2008 | Parodi et al. | |
| 2009/0029204 A1 | 1/2009 | Venkataraman | |
| 2009/0042070 A1 | 2/2009 | Brown, Jr. et al. | |
| 2009/0169452 A1 | 7/2009 | Constantz et al. | |
| 2009/0208784 A1 | 8/2009 | Perry et al. | |
| 2009/0317667 A2 | 12/2009 | Nervi et al. | |
| 2009/0317669 A1 | 12/2009 | Hildebrandt et al. | |
| 2010/0015486 A1 | 1/2010 | Yoshiba | |
| 2010/0148410 A1 | 6/2010 | Bleifuss et al. | |
| 2010/0239924 A1 | 9/2010 | McElroy et al. | |
| 2011/0033771 A1 | 2/2011 | Bednarz et al. | |
| 2011/0104577 A1 | 5/2011 | Cui et al. | |
| 2011/0111315 A1 | 5/2011 | Cui et al. | |
| 2011/0117460 A1 | 5/2011 | Shin | |
| 2011/0154951 A1 | 6/2011 | Hiraoka | |
| 2011/0167821 A1 | 7/2011 | Baker et al. | |
| 2011/0171544 A1 | 7/2011 | Burmeister et al. | |
| 2011/0223500 A1 | 9/2011 | Uematsu et al. | |
| 2011/0223501 A1 | 9/2011 | Uematsu et al. | |
| 2012/0028145 A1 | 2/2012 | Boden et al. | |
| 2012/0171588 A1 | 7/2012 | Fan et al. | |
| 2012/0214076 A1 | 8/2012 | Hakala | |
| 2012/0251898 A1 | 10/2012 | Lehar et al. | |
| 2012/0325053 A1 | 12/2012 | Grossi | |
| 2013/0014484 A1 | 1/2013 | Caprile et al. | |
| 2013/0081516 A1 | 4/2013 | Simmons | |
| 2013/0177824 A1 | 7/2013 | Cui et al. | |
| 2013/0209904 A1 | 8/2013 | Liu et al. | |
| 2013/0337360 A1 | 12/2013 | Mahoney et al. | |
| 2014/0260310 A1 | 9/2014 | Berlowitz et al. | |
| 2015/0093665 A1 | 4/2015 | Barckholtz et al. | |

(56) References Cited

U.S. PATENT DOCUMENTS

| | | |
|---|---|---|
| 2017/0191139 A1 | 7/2017 | Berlowitz et al. |
| 2017/0271701 A1 | 9/2017 | Berlowitz et al. |
| 2019/0386317 A1 | 12/2019 | Poizeau et al. |
| 2020/0020965 A1 | 1/2020 | Wang et al. |
| 2020/0176795 A1 | 6/2020 | Johnson |

FOREIGN PATENT DOCUMENTS

| | | |
|---|---|---|
| CA | 2551219 A1 | 1/2007 |
| CA | 2694153 A1 | 9/2011 |
| CN | 101098022 A | 1/2008 |
| CN | 201902241 U | 7/2011 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 670 090 A1 | 6/2006 |
| EP | 1 926 171 A1 | 5/2008 |
| EP | 2 182 572 A1 | 5/2010 |
| EP | 2 991 139 A1 | 3/2016 |
| JP | S56-69775 A | 6/1981 |
| JP | H05-163180 A | 6/1993 |
| JP | H08-96824 A | 4/1996 |
| JP | H10-172595 A | 6/1998 |
| JP | H11-91427 A | 4/1999 |
| JP | H11-312527 A | 11/1999 |
| JP | 2002-151111 A | 5/2002 |
| JP | 2002-319428 A | 10/2002 |
| JP | 2004-014124 A | 1/2004 |
| JP | 2004-079495 A | 3/2004 |
| JP | 2004-186074 A | 7/2004 |
| JP | 2005-190981 A | 7/2005 |
| JP | 2006-073316 A | 3/2006 |
| JP | 2007-287580 A | 11/2007 |
| JP | 2008-192425 A | 8/2008 |
| JP | 2008-287940 A | 11/2008 |
| JP | 2009-043487 A | 2/2009 |
| JP | 2013-045535 A1 | 3/2013 |
| KR | 10-0651270 B1 | 11/2006 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2008/036169 A2 | 3/2008 |
| WO | 2010/044113 A1 | 4/2010 |
| WO | 2010/067223 A1 | 6/2010 |
| WO | 2010/125443 A1 | 11/2010 |
| WO | 2010/147885 A1 | 12/2010 |
| WO | 2010/147886 A1 | 12/2010 |
| WO | 2011/077224 A1 | 6/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2017/223218 A1 | 12/2017 |
| WO | WO2017223218 | * 12/2017 |

OTHER PUBLICATIONS

"Heat of Combustion", Wikipedia, Retrieved from Internet URL : http://en.wikipediaorg/wiki/Lower_heating_value, accessed on Jun. 24, 2014, pp. 8.

"Lower and Higher Heating Values of Fuels", Hydrogen Data Resource Center: Hydrogen Calculator, p. 1 (2012).

"Molten Carbonate Fuel Cell Technology", Fossil Energy—U.S. Department of Energy, pp. 2 (Jan. 31, 2011).

"Test and Quality Assurance Plan : FuelCell Energy, Inc.—DFC 300A Molten Carbonate Fuel Cell Combined Heat and Power System", Greenhouse Gas Technology Center, pp. 1-42 (Mar. 2007).

Avidan, A. A., "Gasoline and Distillate Fuels from Methanol", Elsevier Science Publishers B.V, pp. 307-323 (1988).

Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).

Appleby, A. J., "Fuel Cells and Hydrogen Fuel", International Journal of Hydrogen Energy, vol. 19, No. 2, pp. 175-180 (1994).

Amorelli, A., et al., "An experimental investigation into the use of molten carbonate fuel cells to capture $CO_2$ from gas turbine exhaust gases", Second annual conference on Carbon Sequestration, pp. 1-9 (May 5-8, 2003).

Amorelli, A., et al., "An experimental investigation into the use of molten carbonate fuel cells to capture $CO_2$ from gas turbine exhaust gases", Energy, vol. 29, pp. 1279-1284 (2004).

Abu-Zahra, M. R.M, et al.,"$CO_2$ capture from power plants: Part I. A parametric study of the technical performance based on monoethanolamine", International Journal of Greenhouse Gas Control, vol. 1, pp. 37-46 (2007).

Appl, M., "Ammonia, 3. Production Plants", Ullmann's Encyclopedia of Industrial Chemistry, vol. 3, pp. 1-35 (2012).

Bianchi A., et al., "Bimodal Pore Size Distribution in MCFC Cathode Structure", Extended Abstracts, Electrochemical Society, vol. 95/01, pp. 858-859 (May 1995).

Cavallaro, S., et al., "Syngas and electricity production by an integrated autothermal reforming/molten carbonate fuel cell system", Journal of Power Sources, vol. 76, pp. 190-196 (1998).

Chiesa, P., et al., "A Comparative Analysis of IGCCs with $CO_2$ Sequestration", Greenhouse Gas Control Technologies, pp. 107-112 (1999).

Campanari, S., "Carbon Dioxide separation from high temperature fuel cell power plants", Journal of Power Sources, vol. 112, pp. 273-289 (2002).

Campanari, S., et al., "$CO_2$ capture from combined cycles integrated with Molten Carbonate Fuel Cells", International Journal of Greenhouse Gas Control, vol. 4, pp. 441-451 (2010).

Campanari, S., et al., "Application of MCFCs for active $CO_2$ capture within natural gas combined cycles", Energy Procedia, vol. 4, pp. 1235-1242 (2011).

Caprile, L., et al., "Carbon capture: Energy wasting technologies or the MCFCs challenge?", International Journal of Hydrogen Energy, vol. 36, pp. 10269-10277 (2011).

Chiesa, P., et al., "$CO_2$ cryogenic separation from combined cycles integrated with molten carbonate fuel cells", International Journal of Hydrogen Energy, vol. 36, pp. 10355-10365 (2011).

Desideri, U., et al., "MCFC-based $CO_2$ capture system for small scale CHP plants", International Journal of Hydrogen Energy, vol. 37, pp. 19295-19303 (2012).

Ghezel-Ayagh, H., "High Efficiency Direct FuelCell/Turbine® Power Plant", Project Fact Sheet, Fuel Cell Energy, pp. 3 (2011).

(56) References Cited

OTHER PUBLICATIONS

Ghezel-Ayagh, H., "Electrochemical Membrane for C02 Capture and Power Generation", Presentation at the 2012 NETL CO2 Capture Technology Meeting, Fuel Cell Energy, pp. 12 (Jul. 9, 2012).
Giddey, S., et al., "A comprehensive review of direct carbon fuel cell technology", Progress in Energy Combustion Science, vol. 38, pp. 360-399 (2012).
Keil, F. J., "Methanol-to-hydrocarbons: process technology", Microporous and Mesoporous Materials, vol. 29, pp. 49-66 (1999).
Kim, D. H., et al., "Numerical studies of a separator for stack temperature control in a molten carbonate fuel cell", International Journal of Hydrogen Energy, vol. 36, pp. 8499-8507 (2011).
Lowe, C., et al., "Technology Assessment of Hydrogen Firing of Process Heaters", Energy Procedia, ScienceDirect, vol. 4, pp. 1058-1065 (2011).
Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).
Manzolini, G., et al., "CO2 Separation from Combined Cycles Using Molten Carbonate Fuel Cells", Journal of Fuel Cell Science and Technology, vol. 9, pp. 011018-1 to 011018-8 (2012).
Naqvi, S. N., "Dimethyl Ether as Fuel", SRI Consulting Report, Report No. 245A, pp. 188 (Sep. 2005).
Pilatowsky, I., et al., "Thermodynamics of Fuel Cells", Cogeneration Fuel Cell-Sorption Air Conditioning Systems, pp. 25-36 (2011).
Sugiura, K., et al., "The carbon dioxide concentrator by using MCFC", Journal of Power Sources, vol. 118, pp. 218-227 (2003).
Steynberg, A., "Gas loop for POX reformers : Figure 8", Studies in Surface Science and Catalysis: Fischer Tropsch Technology, vol. 152, pp. 8 (2004).
Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).
Wesoff, E., "Will FuelCell Energy Be the First Profitable Company in the Industry?", Greentech Media, pp. 3 (Dec. 15, 2011).
Zhou, W., et al., "Decrease of energy demand for bioethanol-based polygeneration system through case study", Applied Energy, vol. 95, pp. 305-311 (2012).
International Search Report and Written Opinion received for PCT Patent Application No. PCT/US2019/063296, dated Feb. 18, 2020, 11 pages.
International Search Report and Written Opinion received for PCT Patent Application No. PCT/US2019/063255, dated Mar. 4, 2020, 11 pages.
International Search Report and Written opinion received for PCT Patent Application No. PCT/US2019/063293, dated Mar. 13, 2020, 10 pages.
International Search Report and Written Opinion received for PCT Patent Application No. PCT/US2019/063301, dated Mar. 13, 2020, 9 pages.
International Search Report and Written Opinion received for PCT Patent Application No. PCT/US2019/063248, dated Mar. 13, 2020, 10 pages.
International Search Report and Written Opinion received for PCT Patent Application No. PCT/US2019/063434, dated Mar. 24, 2020, 11 pages.
International Search Report and Written Opinion received for PCT Patent Application No. PCT/US2019/063337, dated Mar. 31, 2020, 9 pages.
International Search Report and Written Opinion received for PCT Patent Application No. PCT/US2019/063304, dated Apr. 1, 2020, 11 pages.
International Search Report and Written Opinion received for PCT Patent Application No. PCT/US2019/063291, dated Aug. 18, 2020, 13 pages.
International Search Report and Written Opinion received for PCT Patent Application No. PCT/US2019/063345, dated Aug. 20, 2020, 13 pages.
International Search Report and Written Opinion received for PCT Patent Application No. PCT/US2019/063333, dated Nov. 25, 2020, 20 pages.
Campanari, S., et al., "Using MCFC for high efficiency CO2 capture from natural gas combined cycles: Comparison of internal and external reforming", Applied Energy, vol. 112, pp. 772-783 (2013).
Non-Final Office Action dated Jul. 22, 2021 in U.S. Appl. No. 16/695,368, 8 pages.
Non-Final Office Action dated Aug. 3, 2021 in U.S. Appl. No. 16/695,276, 17 pages.
Non-Final Office Action dated Aug. 10, 2021 in U.S. Appl. No. 16/695,281, 15 pages.
Notice of Allowance dated Aug. 17, 2021 in U.S. Appl. No. 16/695,335, 12 pages.
Corrected Notice of Allowance dated Oct. 8, 2021, in U.S. Appl. No. 16/695,335, 3 pages.
Final Office Action dated Nov. 15, 2021, in U.S. Appl. No. 16/695,368, 5 pages.
Corrected Notice of Allowance dated Nov. 24, 2021, in U.S. Appl. No. 16/695,335, 3 pages.
Non-Final Office Action dated Feb. 4, 2022 in U.S. Appl. No. 16/695,278, 18 pages.
Final Office Action dated Dec. 21, 2021 in U.S. Appl. No. 16/695,281, 12 pages.
Non Final Office Action dated Jan. 7, 2022 in U.S. Appl. No. 16/695,286, 6 pages.
Notice of Allowance dated Feb. 11, 2022 in U.S. Appl. No. 16/695,368, 7 pages.

* cited by examiner

OPERATION OF MOLTEN CARBONATE FUEL CELLS WITH HIGH ELECTROLYTE FILL LEVEL

FIELD

Systems and methods are provided for operating molten carbonate fuel cells for enhanced $CO_2$ utilization while maintaining long operational lifetime. The systems and methods include using an increased fill level of electrolyte within the fuel cell and/or associated structures.

BACKGROUND

This application discloses and claims subject matter made as a result of activities within the scope of a joint research agreement between ExxonMobil Research and Engineering Company and FuelCell Energy, Inc. that was in effect on or before the effective filing date of the present application.

Molten carbonate fuel cells utilize hydrogen and/or other fuels to generate electricity. The hydrogen may be provided by reforming methane or other reformable fuels in a steam reformer, such as steam reformer located upstream of the fuel cell or integrated within the fuel cell. Fuel can also be reformed in the anode cell in a molten carbonate fuel cell, which can be operated to create conditions that are suitable for reforming fuels in the anode. Still another option can be to perform some reforming both externally and internally to the fuel cell. Reformable fuels can encompass hydrocarbon materials that can be reacted with steam and/or oxygen at elevated temperature and/or pressure to produce a gaseous product that comprises hydrogen.

One of the attractive features of molten carbonate fuel cells is the ability to transport $CO_2$ from a low concentration stream (such as a cathode input stream) to a higher concentration stream (such as an anode output flow). During operation, $CO_2$ and $O_2$ in an MCFC cathode are converted to carbonate ion ($CO_3^{2-}$), which is then transported across the molten carbonate electrolyte as a charge carrier. The carbonate ion reacts with $H_2$ in the fuel cell anode to form $H_2O$ and $CO_2$. Thus, one of the net outcomes of operating the MCFC is transport of $CO_2$ across the electrolyte. This transport of $CO_2$ across the electrolyte can allow an MCFC to generate electrical power while reducing or minimizing the cost and/or challenge of sequestering carbon oxides from various $CO_x$-containing streams. When an MCFC is paired with a combustion source, such as a natural gas fired power plant, this can allow for additional power generation while reducing or minimizing the overall $CO_2$ emissions that result from power generation.

U.S. Patent Application Publication 2015/0093665 describes methods for operating a molten carbonate fuel cell with some combustion in the cathode to provide supplemental heat for performing additional reforming (and/or other endothermic reactions) within the fuel cell anode. The publication notes that the voltage and/or power generated by a carbonate fuel cell can start to drop rapidly as the $CO_2$ concentration falls below about 1.0 mole %. The publication further state that as the $CO_2$ concentration drops further, e.g., to below about 0.3 vol %, at some point the voltage across the fuel cell can become low enough that little or no further transport of carbonate may occur and the fuel cell ceases to function.

An article by Manzolini et al. (*Journal of Fuel Cell Science and Technology*, Vol. 9, 2012) describes a method for modeling the performance of a power generation system using a fuel cell for $CO_2$ separation. Various fuel cell configurations are modeled for processing a $CO_2$-containing exhaust from a natural gas combined cycle turbine. The fuel cells are used to generate additional power while also concentrating $CO_2$ in the anode exhaust of the fuel cells. The lowest $CO_2$ concentration modeled for the cathode outlet of the fuel cells was roughly 1.4 vol %.

U.S. Pat. No. 7,939,219 describes in-situ delayed addition of carbonate electrolyte for a molten carbonate fuel cell. The delayed addition of carbonate electrolyte is achieved by including additional electrolyte in the fuel cell that remains solid for an extended period of time, such as 2000 hours or more. After the extended period of time, the additional electrolyte melts and replenishes the electrolyte in the fuel cell. This is described as providing for a longer fuel cell lifetime.

U.S. Pat. No. 8,557,468 describes molten carbonate fuel cells with electrolytes that include multiple carbonate components and/or additional lithium precursors. The electrolytes correspond to both eutectic and non-eutectic mixtures of alkali carbonates, optionally with other metal carbonates and/or other lithium precursors.

A journal article titled "Degradation Mechanism of Molten Carbonate Fuel Cell Based on Long-Term Performance: Long-Term Operation by Using Bench-Scale Cell and Post-Test Analysis of the Cell" (Journal of Power Sources, Vol. 195, Issue 20, 15 Oct. 2018) describes addition of carbonate electrolyte at various points after start of operation.

SUMMARY

In an aspect, a method is provided for producing electricity in a molten carbonate fuel cell comprising a lithium-containing electrolyte. The method includes operating a molten carbonate fuel cell comprising an anode, a matrix, and a cathode with a cathode input stream comprising 10 vol % or less of $CO_2$ at an average current density of 120 $mA/cm^2$ or more and a $CO_2$ utilization of 60% or more. The molten carbonate fuel cell includes a combined target electrolyte fill level of 70 vol % or more of a combined matrix pore volume and cathode pore volume.

In another aspect, a method is provided for producing electricity in a molten carbonate fuel cell comprising a lithium-containing electrolyte. The method includes operating a molten carbonate fuel cell comprising an anode, a matrix, and a cathode with a cathode input stream comprising $CO_2$ at an average current density of 120 $mA/cm^2$ or more and a $CO_2$ utilization of 90% or more. The molten carbonate fuel cell includes a combined target electrolyte fill level of 70 vol % or more of a combined matrix pore volume and cathode pore volume.

In still another aspect, a molten carbonate fuel cell is provided. The fuel cell includes a cathode collector, a cathode, a matrix, and an anode. The fuel further includes a lithium-containing electrolyte. Additionally, the fuel cell includes a combined target electrolyte fill level of the lithium-containing electrolyte corresponding to 85 vol % or more of a combined matrix pore volume and cathode pore volume.

DETAILED DESCRIPTION OF THE EMBODIMENTS

Overview

Figure 1:
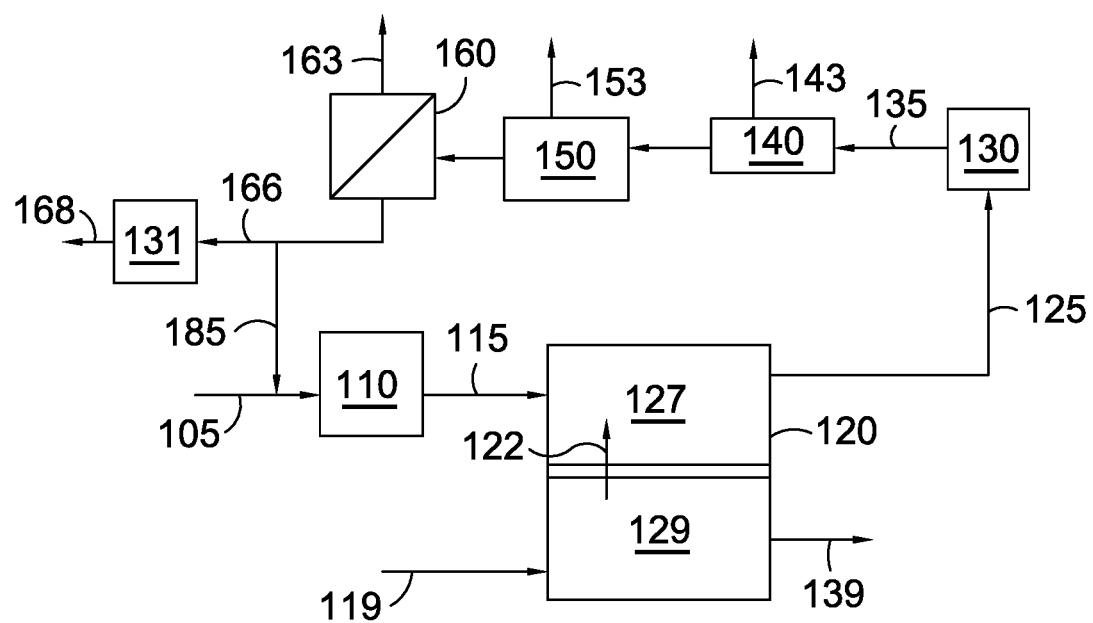
FIG. 1 shows an example of a configuration for molten carbonate fuel cells and associated reforming and separation stages.

In various aspects, an elevated amount of electrolyte is used to initially fill a molten carbonate fuel cell that is operated under carbon capture conditions. The increased initial electrolyte fill level can be achieved in part by adding additional electrolyte to the cathode collector prior to start of operation. The increased initial electrolyte fill level can provide improved fuel cell performance and lifetime when operating a molten carbonate fuel cell at high current density with a low-$CO_2$ content cathode input stream and/or when operating a molten carbonate fuel cell at high $CO_2$ utilization. This is in contrast to fuel cell operation at conventional conditions, where an elevated initial electrolyte fill level leads to reduced operating voltage.

The initial electrolyte fill level can be characterized in several ways. One option is to characterize a combined target electrolyte fill amount for the combined pore volume of the matrix and the cathode. A combined target electrolyte fill level or amount is defined herein as the amount of the combined matrix pore volume and cathode pore volume that would be occupied by the electrolyte if all of the initial electrolyte fill amount were in a molten state and located in the matrix or cathode. It is understood that the target electrolyte fill level is a characterization of the total electrolyte initially added to a molten carbonate fuel cell. Thus, in practice, the combined amount of matrix pore volume and cathode pore volume that will actually be occupied by electrolyte will be lower. This is due, for example, to the fact that not all of the electrolyte melts immediately when starting up a fuel cell, so a portion of the unmelted (solid) electrolyte will likely still be present in the cathode collector. As the fuel cell operates, additional electrolyte will melt, but the consumption of electrolyte by the cathode and/or other electrolyte losses will prevent the actual combined fill level from reaching the "target" combined fill level.

A second option can be to separately characterize the target fill level for the matrix pore volume and the target fill level for the cathode pore volume. It is noted that the cathode pore volume is typically 1.5-2.0 times the matrix pore volume. Thus, when determining a combined target fill level based on the separate target fill levels for the matrix pore volume and the cathode pore volume, the combined target fill level corresponds to a weighted average. For example, if the cathode pore volume is 2.0 times the matrix pore volume, the combined target fill amount can be calculated as (<matrix pore volume>+<2.0*cathode pore volume>)/3. Similarly, if the cathode pore volume is 1.5 times the matrix pore volume, the combined target fill amount can be calculated as (<matrix pore volume>+<1.5*cathode pore volume>)/2.5.

Traditionally, fuel cells have been used as a method to convert chemical energy into electrical energy. Operating conditions were traditionally selected to maintain suitably high operating voltage while efficiently producing electric current. In order to achieve this, the cathode operating conditions were typically selected so that a substantial excess of $CO_2$ was available. This corresponded to, for example, a $CO_2$ concentration in the cathode input flow of 17% or more, with a $CO_2$ utilization of 75% or less.

The amount of electrolyte used in a conventional molten carbonate fuel cell was also selected based on a desire to maintain a high operating voltage. Conventional electrolyte loadings for molten carbonate fuel cells typically correspond to a target fill level of greater than 90 vol % for the matrix (relative to a pore volume of the matrix) and roughly 50 vol % to 60 vol % for the cathode (relative to a pore volume of the cathode). For a fuel cell with a cathode pore volume that is 2.0 times the matrix volume, this corresponds to a combined target fill level of roughly 63 vol % to 73 vol % (determined as a weighted average). For a fuel cell with a cathode pore volume that is 1.5 times the matrix volume, this corresponds to a combined target fill level of roughly 66 vol % to 76 vol %. Under non-carbon capture conditions, such as operating with a $CO_2$ utilization of 75% or less and a $CO_2$ concentration in the cathode input of 12 vol % or more, it has been found that increasing the target electrolyte fill level for the cathode results in a substantial decrease in operating voltage. It is noted that the amount of pore volume in the anode that is occupied by electrolyte is small relative to the pore volume of the cathode and/or relative to the combined pore volume of the matrix and the cathode.

It is noted that U.S. Pat. No. 7,939,219 describes having an additional 10% of the target electrolyte volume present in a fuel cell in the form of an electrolyte that remains solid until later in the operation of the cell. Based on the conventional combined target fill levels described above, an additional 10% of the target electrolyte volume would, at most, correspond to an additional 7.6 vol %, resulting in a combined target fill level of 84 vol % or less.

The electrolyte in a molten carbonate fuel cells typically corresponds to a mixture of lithium carbonate with one or more other alkali metal carbonates. Conventionally, eutectic mixtures of carbonate salts are convenient to use, as the composition of the electrolyte in solid form is the same as the composition that will melt into the fuel cell as electrolyte stored in the cathode collector is melted into a liquid.

It has been discovered that when operating under carbon capture conditions and generating a high current density, an unexpected increase in operating voltage can be achieved by increasing the combined target electrolyte fill level to 70 vol % or more, or 85 vol % or more or 90 vol % or more. For example, the combined target electrolyte fill level can be 70 vol % to 128 vol %, or 85 vol % to 128 vol %, or 90 vol % to 128 vol %, or 100 vol % to 128 vol %, or 70 vol % to 115 vol %, or 85 vol % to 115 vol %, or 90 vol % to 115 vol %, or 70 vol % to 100 vol %, or 85 vol % to 100 vol %, or 90 vol % to 100 vol %. This unexpected voltage increase when operating with an elevated combined target electrolyte fill level can be observed after operating the molten carbonate fuel cell at carbon capture conditions with high current density for a cumulative time of 50 hours or more, or 100 hours or more, or 200 hours or more.

In terms of the individual target fill levels, the unexpected increase in operating voltage can be achieved by using a) a target matrix electrolyte fill level of 90 vol % to 100 vol % for the matrix pore volume and b) a target cathode electrolyte fill level of 65 vol % to 140 vol % of the cathode pore volume, or 65 vol % to 120 vol %, or 65 vol % to 100 vol %, or 75 vol % to 140 vol %, or 75 vol % to 120 vol %, or 75 vol % to 100 vol %, or 85 vol % to 140 vol %, or 85 vol % to 120 vol %, or 85 vol % to 100 vol %, or 95 vol % to 140 vol %, or 95 vol % to 120 vol %.

During conventional operation, increasing the amount of combined target electrolyte fill beyond the conventional 90+ vol % of the matrix pore volume and 50 vol % to 60 vol % of the cathode pore volume results in a substantial loss in operating voltage. However, it has been discovered that when operating a fuel cell under carbon capture conditions with high current density, using an elevated combined target electrolyte fill level provides an unexpected operating voltage benefit over time. Additionally, using an elevated combined target electrolyte fill level when operating the fuel cell under carbon capture conditions with high current density can provide an unexpected increase in fuel cell operating lifetime. Carbon capture conditions, as defined herein, refer to conditions where a fuel cell is operated with a $CO_2$ content in the cathode input stream of 10 vol % or less and/or when operating a fuel cell at a $CO_2$ utilization of 90 vol % or more. In some aspects, when operating with a cathode input stream containing 10 vol % or less of $CO_2$, the $CO_2$ utilization can be 70 vol % or more, or 75 vol % or more, or 80 vol % or more, such as up to 95 vol % or possibly still higher. Operating a fuel cell under carbon capture conditions with high current density refers to conditions where the fuel cell is operated to generate a current density of 120 mA/cm$^2$ or more while operating under carbon capture conditions, or 130 mA/cm$^2$ or more, or 140 mA/cm$^2$ or more, or 150 mA/cm$^2$ or more, such as up to 300 mA/cm$^2$ or possibly still higher.

Without being bound by any particular theory, it is believed that operating under carbon capture conditions causes lithium in the fuel cell to be depleted at an increased rate. Some of the lithium depletion is believed to be due to evaporation or other loss outside of the cell. It is believed that such losses can be accelerated by high space velocities, as may often be used under carbon capture conditions. Other lithium depletion is believed to be due to incorporation of lithium into the fuel cell cathode and/or the matrix. Such incorporation of lithium into structures within the fuel cell can be thermodynamically favored at sufficiently low concentrations of $CO_2$. This electrolyte depletion under carbon capture conditions can cause the electrolyte fill level in the fuel cell to be roughly 20 vol % to 30 vol % lower at end of run than would be expected under conventional operation. When using a conventional electrolyte loading, the increased depletion of lithium results in a loss of fuel cell operating voltage and lifetime.

The electrolyte loss phenomenon reduces the ionic conductivity of the melt and the active area of the cathode, which can result in unfilled pores in the matrix network. As a result, higher ohmic resistance and gas crossover have been observed after extended testing of the fuel cell at carbon capture conditions. This leads to reduced fuel cell voltages even at modest current densities (<100 mA/cm$^2$). Additionally, if gas crossover is occurring in appreciable amounts, this can lead to rapid fuel cell voltage decay. Gas crossover leads to the direct combustion of fuel rather than the electrochemical oxidation and risks oxidation of the anode and the reforming catalyst stored in the anode current collector, impacting directly the stack temperature and the thermal profile. This, combined with the higher voltage decay rate, leads to excess heat generation which reduces the fuel cell operating efficiency and further accelerates decay mechanisms such as corrosion. The effect of site deactivation is more gradual but still detrimental to the long term health of the fuel cell and performance. Increasing the initial electrolyte fill level can offset the additional depletion of lithium when operating a fuel cell under carbon capture conditions.

Additionally or alternately, using an electrolyte with an increased amount of lithium can also be beneficial when operating a fuel cell under carbon capture conditions. Conventionally, eutectic mixtures of carbonate electrolytes have been convenient to use. Because the increase in electrolyte depletion is selective for lithium depletion, however, using an electrolyte containing a greater amount of lithium than a eutectic mixture can potentially be beneficial.

In some aspects, the carbon capture conditions can correspond to conditions where substantial transport of alternative ions occurs as charge carriers across the electrolyte. Hydroxide ions are an example of an alternative ion that can be transported across the electrolyte if the concentration of $CO_2$ is sufficiently low in a localized region of the fuel cell. Conventional operating conditions for molten carbonate fuel cells typically correspond to conditions where the amount of alternative ion transport is reduced, minimized, or non-existent. By contrast, under carbon capture conditions, a portion of the charge transported across the electrolyte in the fuel cell can be based on transport of ions other than carbonate ions.

One difficulty in using MCFCs for elevated $CO_2$ capture is that the operation of the fuel cell can potentially be kinetically limited if one or more of the reactants required for fuel cell operation is present in low quantities. For example, when using a cathode input stream with a $CO_2$ content of 4.0 vol % or less, achieving a $CO_2$ utilization of 75% or more corresponds to a cathode outlet concentration of 1.0 vol % or less. However, a cathode outlet concentration of 1.0 vol % or less does not necessarily mean that the $CO_2$ is evenly distributed throughout the cathode. Instead, the concentration will typically vary within the cathode due to a variety of factors, such as the flow patterns in the anode and the cathode. The variations in $CO_2$ concentration can result in portions of the cathode where $CO_2$ concentrations substantially below 1.0 vol % are present.

Conventionally, it would be expected that depletion of $CO_2$ within the cathode would lead to reduced voltage and reduced current density. However, it has been discovered that current density can be maintained as $CO_2$ is depleted due to ions other than $CO_3^{2-}$ being transported across the electrolyte. For example, a portion of the ions transported across the electrolyte can correspond to hydroxide ions (OH$^-$). The transport of alternative ions across the electrolyte can allow a fuel cell to maintain a target current density even though the amount of $CO_2$ transported across the electrolyte is insufficient.

One of the advantages of transport of alternative ions across the electrolyte is that the fuel cell can continue to operate, even though a sufficient number of $CO_2$ molecules are not kinetically available. This can allow additional $CO_2$ to be transferred from cathode to anode even though the amount of $CO_2$ present in the cathode would conventionally be considered insufficient for normal fuel cell operation. This can allow the fuel cell to operate with a measured $CO_2$ utilization closer to 100%, while the calculated $CO_2$ utilization (based on current density) can be at least 3% greater than the measured $CO_2$ utilization, or at least 5% greater, or at least 10% greater, or at least 20% greater. It is noted that alternative ion transport can allow a fuel cell to operate with a current density that would correspond to more than 100% calculated $CO_2$ utilization.

The amount of alternative ion transport can be quantified based on the transference for a fuel cell. The transference is defined as the fraction of ions transported across the molten carbonate electrolyte that correspond to carbonate ions, as opposed to hydroxide ions and/or other ions. A convenient way to determine the transference can be based on comparing a) the measured change in $CO_2$ concentration at the cathode inlet versus the cathode outlet with b) the amount of carbonate ion transport required to achieve the current density being produced by the fuel cell. It is noted that this definition for the transference assumes that back-transport of $CO_2$ from the anode to the cathode is minimal. It is believed that such back-transport is minimal for the operating conditions described herein. For the $CO_2$ concentrations, the cathode input stream and/or cathode output stream can be sampled, with the sample diverted to a gas chromatograph for determination of the $CO_2$ content. The average current density for the fuel cell can be measured in any convenient manner.

Under conventional operating conditions, the transference can be relatively close to 1.0, such as 0.98 or more and/or such as having substantially no alternative ion transport. A transference of 0.98 or more means that 98% or more of the ionic charge transported across the electrolyte corresponds to carbonate ions. It is noted that hydroxide ions have a charge of −1 while carbonate ions have a charge of −2, so two hydroxide ions need to be transported across the electrolyte to result in the same charge transfer as transport of one carbonate ion.

In contrast to conventional operating conditions, operating a molten carbonate fuel cell with transference of 0.95 or less (or 0.97 or less when operating with a high acidity electrolyte) can increase the effective amount of carbonate ion transport that is achieved, even though a portion of the current density generated by the fuel cell is due to transport of ions other than carbonate ions. In order to operate a fuel cell with a transference of 0.97 or less, or 0.95 or less, depletion of $CO_2$ has to occur within the fuel cell cathode. It has been discovered that such depletion of $CO_2$ within the cathode tends to be localized. As a result, many regions within a fuel cell cathode can still have sufficient $CO_2$ for normal operation. These regions contain additional $CO_2$ that would be desirable to transport across an electrolyte, such as for carbon capture. However, the $CO_2$ in such regions is typically not transported across the electrolyte when operating under conventional conditions. By selecting operating conditions with a transference of 0.97 or less, or 0.95 or less, the regions with sufficient $CO_2$ can be used to transport additional $CO_2$ while the depleted regions can operate based on alternative ion transport. This can increase the practical limit for the amount of $CO_2$ captured from a cathode input stream.

Electrolyte Fill Level and Composition

The electrolyte loading within a molten carbonate fuel cell can be controlled based on the amount of electrolyte included in the fuel cell during initial formation of the fuel cell. For practical reasons, attempting to add electrolyte to a fuel cell after forming a fuel cell structure is not economically attractive. Instead, fuel cells are usually constructed used, for a desired lifetime, and then disassembled with recovery of any usable components for use in future fuel cell construction. As a result, the electrolyte fill level within a fuel cell can be characterized based on the amount of electrolyte included in the fuel cell when it is constructed relative to the available pore volume in the matrix and the cathode of the fuel cell. This electrolyte fill level at construction can be referred to as a target electrolyte fill level. It is noted that the target electrolyte fill level refers to electrolyte that is added to the fuel cell prior to initial operation. Thus, any electrolyte added after the beginning of fuel cell operation is be definition excluded from the target electrolyte fill level.

The electrolyte included in a molten carbonate fuel cell is a solid at ambient conditions. Thus, during construction of a fuel cell, the target fill level of the electrolyte can be included in the fuel cell as a solid. This solid electrolyte may be at least partially included in structures other than the matrix and the cathode. For example, at least a portion of the solid electrolyte can be incorporated into the cathode collector of the fuel cell. As the fuel cell is heated to reach the desired operating temperature, the electrolyte can melt, which causes electrolyte to flow toward the matrix and cathode within the fuel cell.

Commonly a cathode fill level of roughly 50 vol % to 60 vol % at the beginning of life with a completely filled matrix (greater than 90 vol % of matrix pore volume) is targeted. As noted above, this conventional loading corresponds to a combined target fill level of roughly 76 vol % or less, depending on the relative pore volumes of the cathode and the matrix. As the solid electrolyte melts, capillary force and the surface tension cause the electrolyte to distribute throughout the pore network therefore creating a high density of electrochemically active sites. With a completely filled matrix, gas crossover is minimal and the conductivity of the membrane layer is maximized Alternatively, higher cathode fill levels are typically not used in order to avoid cathode flooding. This occurs when excess electrolyte exists in the cathode layer, increasing the gas phase mass transfer resistance through the porous electrode. Under conventional conditions, cathode flooding is known to be detrimental to fuel cell performance.

The electrolyte fill level in a fuel cell can be characterized based on a comparison of the volume of electrolyte (based on being a liquid at the operating temperature of the fuel cell) relative to the pore volume in the matrix and the cathode in the fuel cell. For the electrolyte, the volume of liquid electrolyte at the operating temperature can be calculated based on the corresponding volume (or weight) of solid electrolyte included in the fuel cell during formation of the fuel cell. With regard to the available pore volume, both the matrix and the cathode in a fuel cell correspond to porous structures. For example, the matrix can correspond to a porous structure that is suitable for holding the molten carbonate electrolyte. An example of a suitable matrix material is a matrix composed of aluminum oxide and lithium aluminate. An example of a suitable cathode material is nickel oxide. The pore volume of these structures can be characterized using a convenient porosimetry method. In this discussion, the pore volume of a layer (matrix, cathode, anode) can be determined by mercury porosimetry, such as by ASTM D4284.

Conventionally, the target electrolyte fill level within a fuel cell is selected in order to provide a balance between having sufficient electrolyte in the cathode to provide good electrical conductivity while also having sufficient void space in the cathode so that $CO_2$ and $O_2$ gas can enter the porous cathode for conversion into carbonate ions. Conventionally, this corresponds to having a combined target electrolyte fill level of 76 vol % or less, which corresponds to 50 vol % to 60 vol % of the available pore volume in the cathode, along with filling substantially all of the available pore volume in the electrolyte matrix (greater than 90 vol %). These fill levels can be achieved by including sufficient amounts of solid electrolyte in the matrix, the cathode, and/or the cathode collector prior to starting operation of the fuel cell.

In some aspects, any convenient type of electrolyte suitable for operation of a molten carbonate fuel cell can be used. Many conventional MCFCs use a eutectic carbonate mixture as the carbonate electrolyte, such as a eutectic mixture of 62 mol % lithium carbonate and 38 mol % potassium carbonate (62% $Li_2CO_3$/38% $K_2CO_3$) or a eutectic mixture of 52 mol % lithium carbonate and 48 mol % sodium carbonate (52% $Li_2CO_3$/48% $Na_2CO_3$). Other eutectic mixtures are also available, such as a eutectic mixture of 40 mol % lithium carbonate and 60 mol % potassium carbonate (40 mol % $Li_2CO_3$/60 mol % $K_2CO_3$) or ternary eutectic Li/Na/K (44 mol % $Li_2CO_3$/30 mol % $Na_2CO_3$/26 mol % $K_2CO_3$) or any binary eutectic Li/Na (52 mol % $Li_2CO_3$/48 mol % $Na_2CO_3$) doped with $K_2CO_3$ and/or $Cs_2CO_3$ and/or $Rb_2CO_3$.

Still other eutectic mixtures can be based on combinations of three or more carbonates, including eutectic mixtures containing three or more alkali metal carbonates. Yet other mixtures can be based on combinations of three or more carbonates, so that the mixture differs from a eutectic mixture. Additionally or alternately, still other mixtures can include one or more lithium precursors different from lithium carbonate.

In aspects where three or more carbonates are included in the electrolyte, the electrolyte can include a mixture of three or more of $Li_2CO_3$, $Na_2CO_3$, $K_2CO_3$, $Rb_2CO_3$, $Cs_2CO_3$, $BaCO_3$, $La_2O_3$, $Bi_2O_3$, $Bi_2O_5$, $Ta_2O_5$, and mixtures thereof. In some aspects, 70 wt % or more, or 80 wt % or more, or 90 wt % or more, such as up to substantially all of the alkali metal carbonates in the electrolyte can correspond to a mixture of two or more of $Li_2CO_3$, $Na_2CO_3$, and $K_2CO_3$. Preferably, 65 wt % or more, or 80 wt % or more, or 90 wt % or more, such as up to substantially all of the electrolyte can correspond to alkali metal carbonates. In aspects where a lithium precursor material is included, the lithium precursor material can optionally but preferably be one or more of lithium hydroxide, lithium nitrate, lithium acetate, lithium oxalate and mixtures thereof.

While eutectic mixtures of carbonate can be convenient as an electrolyte for various reasons, in some aspects non-eutectic mixtures of carbonates can be advantageous. In particular, because lithium is selectively lost under carbon capture conditions, it is believed that using a non-eutectic mixture of carbonates with more lithium carbonate than the eutectic point can be beneficial. In this discussion, the difference between the composition for a mixture of carbonates and a eutectic composition can be characterized based on the difference in the weight percentage of lithium carbonate in the mixture versus the weight percentage of lithium carbonate in the corresponding eutectic mixture. For determining the corresponding eutectic mixture, all alkali metal carbonates are included, but non-alkali metal carbonates that are present in an amount of 2 wt % or less are not considered. As an example, if a mixture of 80 wt % lithium carbonate and 20 wt % sodium carbonate is used, the mixture can be characterized as having a lithium carbonate content that differs from the corresponding eutectic mixture by 28 wt %. Generally, non-eutectic mixtures can include various combinations of any of the carbonates and/or lithium precursor materials described herein.

In some aspects, the target electrolyte fill level can be based on including a plurality of types of carbonate mixtures in the fuel cell. For example, non-eutectic mixtures are known to melt more slowly under fuel cell operating conditions than eutectic mixtures. Therefore, one strategy can be to have a first portion of the electrolyte (located in the matrix and/or cathode) that corresponds to a eutectic mixture, while a second portion of the electrolyte (located in the cathode collector) that corresponds to a non-eutectic mixture with an increased amount of lithium relative to the eutectic mixture. Using this type of strategy, the slower melting non-eutectic mixture will have a higher lithium content than the initial electrolyte, and therefore can compensate for the selective loss of lithium during operation under carbon capture conditions. Alternatively, two non-eutectic mixtures can be used, with the second mixture being higher in lithium carbonate content than the first mixture. Depending on the aspect, the amount of the first electrolyte mixture (i.e., the electrolyte mixture lower in lithium carbonate content, such as a eutectic mixture) can correspond to 20 wt % to 80 wt % of the total amount of electrolyte in the initial electrolyte fill level, or 20 wt % to 50 wt %, or 55 wt % to 80 wt %.

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack". This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell". For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

Example of Molten Carbonate Fuel Cell Structure

Figure 3:
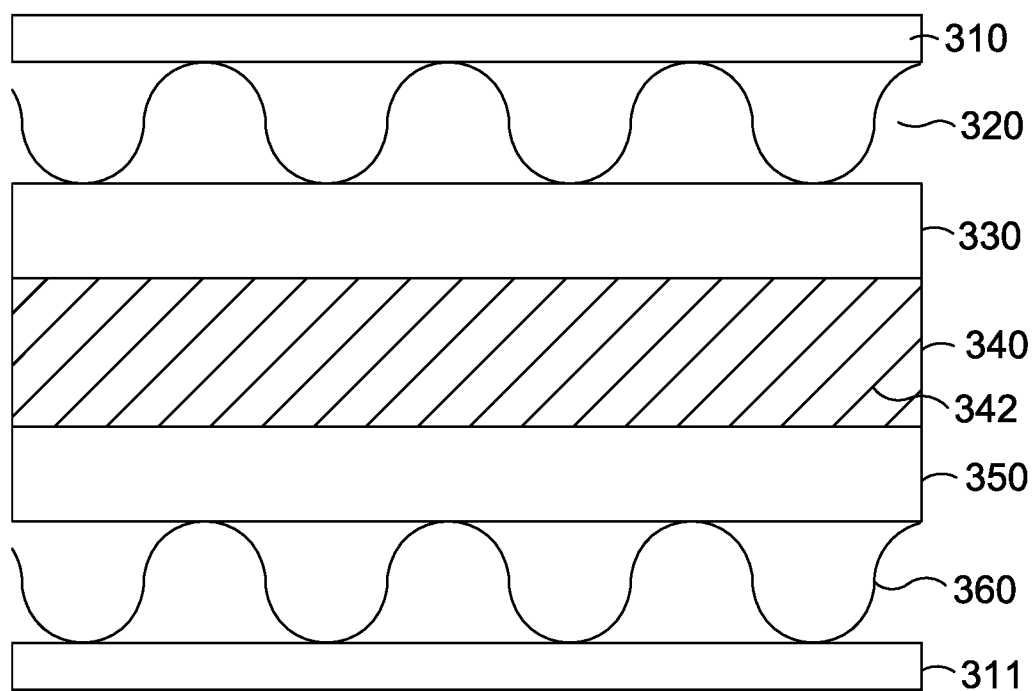
FIG. 3 shows an example of a molten carbonate fuel cell.

FIG. 3 shows a general example of a molten carbonate fuel cell. The fuel cell represented in FIG. 3 corresponds to a fuel cell that is part of a fuel cell stack. In order to isolate the fuel cell from adjacent fuel cells in the stack, the fuel cell includes separator plates 310 and 311. In FIG. 3, the fuel cell includes an anode 330 and a cathode 350 that are separated by an electrolyte matrix 340 that contains an electrolyte 342. Anode collector 320 provides electrical contact between anode 330 and the other anodes in the stack, while cathode collector 360 provides similar electrical contact between cathode 350 and the other cathodes in the fuel cell stack. Additionally, anode collector 320 allows for introduction and exhaust of gases from anode 330, while cathode collector 360 allows for introduction and exhaust of gases from cathode 350.

For the initial electrolyte fill, solid electrolyte can be incorporated, as possible, within the matrix, the cathode, and the cathode collector. Because the electrolyte is solid during initial fill, it can be difficult to achieve a desired loading by only adding the solid electrolyte to the matrix and the cathode. In order to achieve a desired loading, solid electrolyte can also be added to the cathode collector. The electrolyte added to the cathode collector can melt as the fuel cell is operated, which then allows the electrolyte to flow into the cathode. Similarly, as electrolyte in the cathode is melted, a portion of the molten electrolyte can be passed from the cathode to the matrix to fill additional portions of the matrix volume.

It is noted that practical considerations can also limit the amount of solid electrolyte that is added to the cathode collector. Because the solid electrolyte melts over time, if the loading of solid electrolyte in the cathode collector is too high, the ability for gas to flow through the cathode collector to reach the cathode may be limited. It has been discovered that target electrolyte loading of electrolyte of up to 140 vol % of the cathode pore volume can be used while having minimal impact on gas transfer by using an off-eutectic composition in the cathode current collector. However, further addition of electrolyte can potentially limit gas transfer in an undesirable manner. Relative to the available surface area in the fuel cell, this can correspond to a target loading of 66 grams or less of electrolyte per 250 $cm^2$ of fuel cell area. In some aspects, the target loading can be 40 grams to 66 grams of electrolyte per 250 $cm^2$ of fuel cell area, or 45 grams to 66 grams, or 50 grams to 66 grams. It is noted that a portion of the target electrolyte loading can be included in the cathode collector. The portion of the target electrolyte loading included in the cathode collector can correspond to 38 grams of electrolyte or less per 250 $cm^2$ of fuel cell area. In some aspects, the portion of the target electrolyte loading included in the cathode collector can correspond to 18 grams to 38 grams of electrolyte per 250 $cm^2$ of fuel cell area, or 24 grams to 38 grams, or 28 grams to 38 grams.

During operation, $CO_2$ is passed into the cathode collector 360 along with $O_2$. The $CO_2$ and $O_2$ diffuse into the porous cathode 350 and travel to a cathode interface region near the boundary of cathode 350 and electrolyte matrix 340. In the cathode interface region, a portion of electrolyte 342 can be present in the pores of cathode 350. The $CO_2$ and $O_2$ can be converted near/in the cathode interface region to carbonate ion ($CO_3^{2-}$), which can then be transported across electrolyte 342 (and therefore across electrolyte matrix 340) to facilitate generation of electrical current. In aspects where alternative ion transport is occurring, a portion of the $O_2$ can be converted to an alternative ion, such as a hydroxide ion or a peroxide ion, for transport in electrolyte 342. After transport across the electrolyte 342, the carbonate ion (or alternative ion) can reach an anode interface region near the boundary of electrolyte matrix 340 and anode 330. The carbonate ion can be converted back to $CO_2$ and $H_2O$ in the presence of $H_2$, releasing electrons that are used to form the current generated by the fuel cell. The $H_2$ and/or a hydrocarbon suitable for forming $H_2$ are introduced into anode 330 via anode collector 320.

The flow direction within the anode of a molten carbonate fuel cell can have any convenient orientation relative to the flow direction within a cathode. One option can be to use a cross-flow configuration, so that the flow direction within the anode is roughly at a 90° angle relative to the flow direction within the cathode. This type of flow configuration can have practical benefits, as using a cross-flow configuration can allow the manifolds and/or piping for the anode inlets/outlets to be located on different sides of a fuel cell stack from the manifolds and/or piping for the cathode inlets/outlets.

Conditions for Molten Carbonate Fuel Operation

When operating a molten carbonate fuel cell to perform carbon capture, optionally with a current density of 120 $mA/cm^2$ or more, suitable conditions for the anode can include providing the anode with $H_2$, a reformable fuel, or a combination thereof; and operating with any convenient fuel utilization that generates a desired current density, including fuel utilizations ranging from 20% to 80%. In some aspects this can correspond to a traditional fuel utilization amount, such as a fuel utilization of 60% or more, or 70% or more, such as up to 85% or possibly still higher. In other aspects, this can correspond to a fuel utilization selected to provide an anode output stream with an elevated content of $H_2$ and/or an elevated combined content of $H_2$ and CO (i.e., syngas), such as a fuel utilization of 55% or less, or 50% or less, or 40% or less, such as down to 20% or possibly still lower. The $H_2$ content in the anode output stream and/or the combined content of $H_2$ and CO in the anode output stream can be sufficient to allow generation of a desired current density. In some aspects, the $H_2$ content in the anode output stream can be 3.0 vol % or more, or 5.0 vol % or more, or 8.0 vol % or more, such as up to 15 vol % or possibly still higher. Additionally or alternatively, the combined amount of $H_2$ and CO in the anode output stream can be 4.0 vol % or more, or 6.0 vol % or more, or 10 vol % or more, such as up to 20 vol % or possibly still higher. Optionally, when the fuel cell is operated with low fuel utilization, the $H_2$ content in the anode output stream can be in a higher range, such as an $H_2$ content of 10 vol % to 25 vol %. In such aspects, the syngas content of the anode output stream can be correspondingly higher, such as a combined $H_2$ and CO content of 15 vol % to 35 vol %. Depending on the aspect, the anode can be operated to increase the amount of electrical energy generated, to increase the amount of chemical energy generated, (i.e., $H_2$ generated by reforming that is available in the anode output stream), or operated using any other convenient strategy that is compatible with operating the fuel cell to cause alternative ion transport.

In various aspects, the anode input stream for a MCFC can include hydrogen, a hydrocarbon such as methane, a hydrocarbon or hydrocarbon-like compound that may contain heteroatoms different from C and H, or a combination thereof. The source of the hydrogen/hydrocarbon/hydrocarbon-like compounds can be referred to as a fuel source. In some aspects, most of the methane (or other hydrocarbon, hydrocarbon, or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane.

The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an anode input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing $C_1$-$C_4$ carbon compounds (such as methane or ethane), and streams containing heavier $C_{5+}$ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inert components, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternatively, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternatively be suitable for inclusion in an anode input stream, such as light ends ($C_1$-$C_4$) generated during cracking or other refinery processes. Still other suitable refinery streams can additionally or alternatively include refinery streams containing CO or $CO_2$ that also contain $H_2$ and/or reformable fuel compounds.

Still other potential sources for an anode input can additionally or alternatively include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions.

The anode exhaust can be subjected to a variety of gas processing options, including water-gas shift and separation of the components from each other. Two general anode processing schemes are shown in FIGS. 1 and 2.

Figure 2:
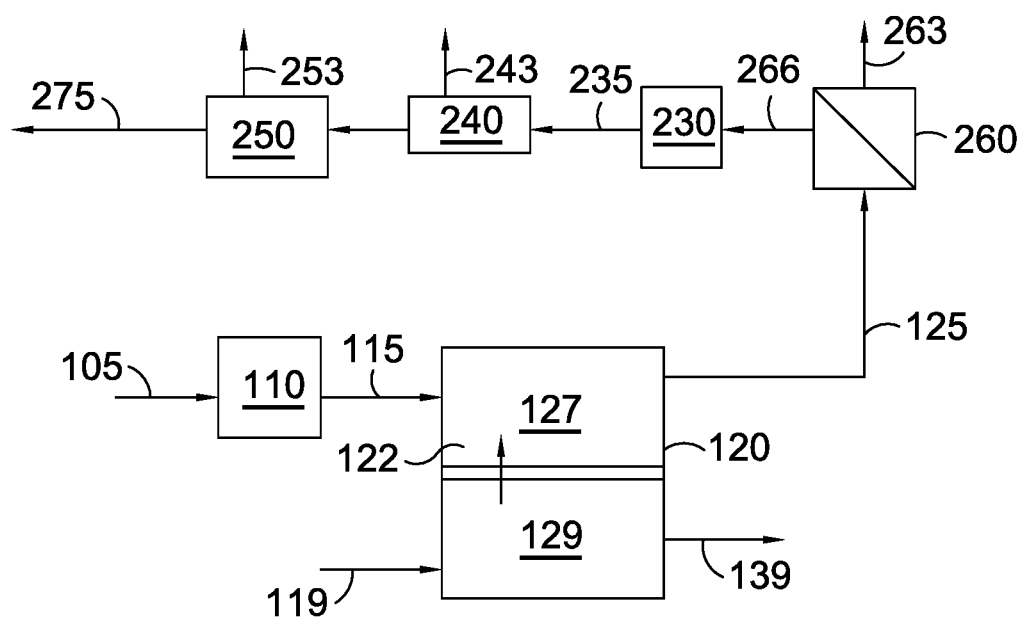
FIG. 2 shows another example of a configuration for molten carbonate fuel cells and associated reforming and separation stages.

FIG. 1 schematically shows an example of a reaction system for operating a fuel cell array of molten carbonate fuel cells in conjunction with a chemical synthesis process. In FIG. 1, a fuel stream 105 is provided to a reforming stage (or stages) 110 associated with the anode 127 of a fuel cell 120, such as a fuel cell that is part of a fuel cell stack in a fuel cell array. The reforming stage 110 associated with fuel cell 120 can be internal to a fuel cell assembly. In some optional aspects, an external reforming stage (not shown) can also be used to reform a portion of the reformable fuel in an input stream prior to passing the input stream into a fuel cell assembly. Fuel stream 105 can preferably include a reformable fuel, such as methane, other hydrocarbons, and/or other hydrocarbon-like compounds such as organic compounds containing carbon-hydrogen bonds. Fuel stream 105 can also optionally contain $H_2$ and/or CO, such as $H_2$ and/or CO provided by optional anode recycle stream 185. It is noted that anode recycle stream 185 is optional, and that in many aspects no recycle stream is provided from the anode exhaust 125 back to anode 127, either directly or indirectly via combination with fuel stream 105 or reformed fuel stream 115. After reforming, the reformed fuel stream 115 can be passed into anode 127 of fuel cell 120. A $CO_2$ and $O_2$-containing stream 119 can also be passed into cathode 129. A flow of carbonate ions 122, $CO_3^{2-}$, from the cathode portion 129 of the fuel cell can provide the remaining reactant needed for the anode fuel cell reactions. Based on the reactions in the anode 127, the resulting anode exhaust 125 can include $H_2O$, $CO_2$, one or more components corresponding to incompletely reacted fuel ($H_2$, CO, $CH_4$, or other components corresponding to a reformable fuel), and optionally one or more additional nonreactive components, such as $N_2$ and/or other contaminants that are part of fuel stream 105. The anode exhaust 125 can then be passed into one or more separation stages. For example, a $CO_2$ removal stage 140 can correspond to a cryogenic $CO_2$ removal system, an amine wash stage for removal of acid gases such as $CO_2$, or another suitable type of $CO_2$ separation stage for separating a $CO_2$ output stream 143 from the anode exhaust. Optionally, the anode exhaust can first be passed through a water gas shift reactor 130 to convert any CO present in the anode exhaust (along with some $H_2O$) into $CO_2$ and $H_2$ in an optionally water gas shifted anode exhaust 135. Depending on the nature of the $CO_2$ removal stage, a water condensation or removal stage 150 may be desirable to remove a water output stream 153 from the anode exhaust. Though shown in FIG. 1 after the $CO_2$ separation stage 140, it may optionally be located before the $CO_2$ separation stage 140 instead. Additionally, an optional membrane separation stage 160 for separation of $H_2$ can be used to generate a high purity permeate stream 163 of $H_2$. The resulting retentate stream 166 can then be used as an input to a chemical synthesis process. Stream 166 could additionally or alternately be shifted in a second water-gas shift reactor 131 to adjust the $H_2$, CO, and $CO_2$ content to a different ratio, producing an output stream 168 for further use in a chemical synthesis process. In FIG. 1, anode recycle stream 185 is shown as being withdrawn from the retentate stream 166, but the anode recycle stream 185 could additionally or alternately be withdrawn from other convenient locations in or between the various separation stages. The separation stages and shift reactor(s) could additionally or alternately be configured in different orders, and/or in a parallel configuration. Finally, a stream with a reduced content of $CO_2$ 139 can be generated as an output from cathode 129. For the sake of simplicity, various stages of compression and heat addition/removal that might be useful in the process, as well as steam addition or removal, are not shown.

As noted above, the various types of separations performed on the anode exhaust can be performed in any convenient order. FIG. 2 shows an example of an alternative order for performing separations on an anode exhaust. In FIG. 2, anode exhaust 125 can be initially passed into separation stage 260 for removing a portion 263 of the hydrogen content from the anode exhaust 125. This can allow, for example, reduction of the $H_2$ content of the anode exhaust to provide a retentate 266 with a ratio of $H_2$ to CO closer to 2:1. The ratio of $H_2$ to CO can then be further adjusted to achieve a desired value in a water gas shift stage 230. The water gas shifted output 235 can then pass through $CO_2$ separation stage 240 and water removal stage 250 to produce an output stream 275 suitable for use as an input to a desired chemical synthesis process. Optionally, output stream 275 could be exposed to an additional water gas shift stage (not shown). A portion of output stream 275 can optionally be recycled (not shown) to the anode input. Of course, still other combinations and sequencing of separation stages can be used to generate a stream based on the anode output that has a desired composition. For the sake of simplicity, various stages of compression and heat addition/removal that might be useful in the process, as well as steam addition or removal, are not shown.

Cathode Inputs and Outputs

When operating under carbon capture conditions, suitable conditions for the cathode can include providing the cathode with cathode input flow that includes $CO_2$ and $O_2$. In aspects where the carbon capture conditions correspond to conditions where alternative ion transport occurs, the cathode input flow can further include a sufficient amount of water.

The $CO_2$ concentration in the cathode input flow can be 10 vol % or less, or 8.0 vol % or less, or 6.0 vol % or less, or 4.0 vol % or less, such as down to 1.5 vol % or possibly still lower. Additionally or alternately, the cathode can be operated at a $CO_2$ utilization of 60% or more, or 70% or more, or 80% or more, such as up to 95% or possibly still higher. It is noted that if the $CO_2$ utilization is less than 80%, then the $CO_2$ concentration in the cathode input flow can be 10 vol % or less. In some aspects, the $O_2$ concentration in the cathode input stream can correspond to an oxygen content of 4.0 vol % to 15 vol %, or 6.0 vol % to 10 vol %.

In aspects where the carbon capture conditions correspond to conditions where alternative ion transport occurs, it has been observed that a sufficient amount of water should also be present for alternative ion transport to occur. This can correspond to having 1.0 vol % or more of water present in the cathode input flow, or 2.0 vol % or more. It is noted that because air is commonly used as an $O_2$ source, and since $H_2O$ is one of the products generated during combustion (a common source of $CO_2$), a sufficient amount of water is typically available within the cathode.

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air).

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternately be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternately, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/nonreactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen ($NO_x$) and/or sulfur ($SO_x$), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the cathode input stream, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at very low temperature, for example after a wet gas scrubber on a coal-fired boiler, in which case the combustion exhaust can be below about 100° C. Alternatively, the combustion exhaust could be from the exhaust of a gas turbine operated in combined cycle mode, in which the gas can be cooled by raising steam to run a steam turbine for additional power generation. In this case, the gas can be below about 50° C. Heat can be added to a combustion exhaust that is cooler than desired.

Additional Molten Carbonate Fuel Cell Operating Strategies

In some aspects, when operating a MCFC to cause alternative ion transport, the anode of the fuel cell can be operated at a traditional fuel utilization value of roughly 60% to 80%. When attempting to generate electrical power, operating the anode of the fuel cell at a relatively high fuel utilization can be beneficial for improving electrical efficiency (i.e., electrical energy generated per unit of chemical energy consumed by the fuel cell).

In some aspects, it may be beneficial to reduce the electrical efficiency of the fuel cell in order to provide other benefits, such as an increase in the amount of $H_2$ provided in the anode output flow. This can be beneficial, for example, if it is desirable to consume excess heat generated in the fuel cell (or fuel cell stack) by performing additional reforming and/or performing another endothermic reaction. For example, a molten carbonate fuel cell can be operated to provide increased production of syngas and/or hydrogen. The heat required for performing the endothermic reforming reaction can be provided by the exothermic electrochemical reaction in the anode for electricity generation. Rather than attempting to transport the heat generated by the exothermic fuel cell reaction(s) away from the fuel cell, this excess heat can be used in situ as a heat source for reforming and/or another endothermic reaction. This can result in more efficient use of the heat energy and/or a reduced need for additional external or internal heat exchange. This efficient production and use of heat energy, essentially in-situ, can reduce system complexity and components while maintaining advantageous operating conditions. In some aspects, the amount of reforming or other endothermic reaction can be selected to have an endothermic heat requirement comparable to, or even greater than, the amount of excess heat generated by the exothermic reaction(s) rather than significantly less than the heat requirement typically described in the prior art.

Additionally or alternatively, the fuel cell can be operated so that the temperature differential between the anode inlet and the anode outlet can be negative rather than positive. Thus, instead of having a temperature increase between the anode inlet and the anode outlet, a sufficient amount of reforming and/or other endothermic reaction can be performed to cause the output stream from the anode outlet to be cooler than the anode inlet temperature. Further additionally or alternatively, additional fuel can be supplied to a heater for the fuel cell and/or an internal reforming stage (or other internal endothermic reaction stage) so that the temperature differential between the anode input and the anode output can be smaller than the expected difference based on the relative demand of the endothermic reaction(s) and the combined exothermic heat generation of the cathode combustion reaction and the anode reaction for generating electrical power. In aspects where reforming is used as the endothermic reaction, operating a fuel cell to reform excess fuel can allow for production of increased synthesis gas and/or increased hydrogen relative to conventional fuel cell operation while minimizing the system complexity for heat exchange and reforming. The additional synthesis gas and/or additional hydrogen can then be used in a variety of applications, including chemical synthesis processes and/or collection/repurposing of hydrogen for use as a "clean" fuel.

The amount of heat generated per mole of hydrogen oxidized by the exothermic reaction at the anode can be substantially larger than the amount of heat consumed per mole of hydrogen generated by the reforming reaction. The net reaction for hydrogen in a molten carbonate fuel cell ($H_2 + \frac{1}{2} O_2 \rightarrow H_2O$) can have an enthalpy of reaction of about −285 kJ/mol of hydrogen molecules. At least a portion of this energy can be converted to electrical energy within the fuel cell. However, the difference (approximately) between the enthalpy of reaction and the electrical energy produced by the fuel cell can become heat within the fuel cell. This quantity of energy can alternatively be expressed as the current density (current per unit area) for the cell multiplied by the difference between the theoretical maximum voltage of the fuel cell and the actual voltage, or <current density>* (Vmax−Vact). This quantity of energy is defined as the "waste heat" for a fuel cell. As an example of reforming, the enthalpy of reforming for methane ($CH_4 + 2H_2O \rightarrow 4 H_2 + CO_2$) can be about 250 kJ/mol of methane, or about 62 kJ/mol of hydrogen molecules. From a heat balance standpoint, each hydrogen molecule electrochemically oxidized can generate sufficient heat to generate more than one hydrogen molecule by reforming. In a conventional configuration, this excess heat can result in a substantial temperature difference from anode inlet to anode outlet. Instead of allowing this excess heat to be used for increasing the temperature in the fuel cell, the excess heat can be consumed by performing a matching amount of the reforming reaction. The excess heat generated in the anode can be supplemented with the excess heat generated by the combustion reaction in the fuel cell. More generally, the excess heat can be consumed by performing an endothermic reaction in the fuel cell anode and/or in an endothermic reaction stage heat integrated with the fuel cell.

Depending on the aspect, the amount of reforming and/or other endothermic reaction can be selected relative to the amount of hydrogen reacted in the anode in order to achieve a desired thermal ratio for the fuel cell. As used herein, the "thermal ratio" is defined as the heat produced by exothermic reactions in a fuel cell assembly (including exothermic reactions in both the anode and cathode) divided by the endothermic heat demand of reforming reactions occurring within the fuel cell assembly. Expressed mathematically, the thermal ratio (TH)=$Q_{EX}/Q_{EN}$, where $Q_{EX}$ is the sum of heat produced by exothermic reactions and $Q_{EN}$ is the sum of heat consumed by the endothermic reactions occurring within the fuel cell. Note that the heat produced by the exothermic reactions can correspond to any heat due to reforming reactions, water gas shift reactions, combustion reactions (i.e., oxidation of fuel compounds) in the cathode, and/or the electrochemical reactions in the cell. The heat generated by the electrochemical reactions can be calculated based on the ideal electrochemical potential of the fuel cell reaction across the electrolyte minus the actual output voltage of the fuel cell. For example, the ideal electrochemical potential of the reaction in a MCFC is believed to be about 1.04 V based on the net reaction that occurs in the cell. During operation of the MCFC, the cell can typically have an output voltage less than 1.04 V due to various losses. For example, a common output/operating voltage can be about 0.7 V. The heat generated can be equal to the electrochemical potential of the cell (i.e. ~1.04V) minus the operating voltage. For example, the heat produced by the electrochemical reactions in the cell can be ~0.34 V when the output voltage of ~0.7V is attained in the fuel cell. Thus, in this scenario, the electrochemical reactions would produce ~0.7 V of electricity and ~0.34 V of heat energy. In such an example, the ~0.7 V of electrical energy is not included as part of $Q_{EX}$. In other words, heat energy is not electrical energy.

In various aspects, a thermal ratio can be determined for any convenient fuel cell structure, such as a fuel cell stack, an individual fuel cell within a fuel cell stack, a fuel cell stack with an integrated reforming stage, a fuel cell stack with an integrated endothermic reaction stage, or a combination thereof. The thermal ratio may also be calculated for different units within a fuel cell stack, such as an assembly of fuel cells or fuel cell stacks. For example, the thermal ratio may be calculated for a fuel cell (or a plurality of fuel cells) within a fuel cell stack along with integrated reforming stages and/or integrated endothermic reaction stage elements in sufficiently close proximity to the fuel cell(s) to be integrated from a heat integration standpoint.

From a heat integration standpoint, a characteristic width in a fuel cell stack can be the height of an individual fuel cell stack element. It is noted that the separate reforming stage and/or a separate endothermic reaction stage could have a different height in the stack than a fuel cell. In such a scenario, the height of a fuel cell element can be used as the characteristic height. In this discussion, an integrated endothermic reaction stage can be defined as a stage heat integrated with one or more fuel cells, so that the integrated endothermic reaction stage can use the heat from the fuel cells as a heat source for reforming. Such an integrated endothermic reaction stage can be defined as being positioned less than 10 times the height of a stack element from fuel cells providing heat to the integrated stage. For example, an integrated endothermic reaction stage (such as a reforming stage) can be positioned less than 10 times the height of a stack element from any fuel cells that are heat integrated, or less than 8 times the height of a stack element, or less than 5 times the height of a stack element, or less than 3 times the height of a stack element. In this discussion, an integrated reforming stage and/or integrated endothermic reaction stage that represents an adjacent stack element to a fuel cell element is defined as being about one stack element height or less away from the adjacent fuel cell element.

A thermal ratio of about 1.3 or less, or about 1.15 or less, or about 1.0 or less, or about 0.95 or less, or about 0.90 or less, or about 0.85 or less, or about 0.80 or less, or about 0.75 of less, can be lower than the thermal ratio typically sought in use of MCFC fuel cells. In aspects of the invention, the thermal ratio can be reduced to increase and/or optimize syngas generation, hydrogen generation, generation of another product via an endothermic reaction, or a combination thereof.

In various aspects of the invention, the operation of the fuel cells can be characterized based on a thermal ratio. Where fuel cells are operated to have a desired thermal ratio, a molten carbonate fuel cell can be operated to have a thermal ratio of about 1.5 or less, for example about 1.3 or less, or about 1.15 or less, or about 1.0 or less, or about 0.95 or less, or about 0.90 or less, or about 0.85 or less, or about 0.80 or less, or about 0.75 or less. Additionally or alternately, the thermal ratio can be at least about 0.25, or at least about 0.35, or at least about 0.45, or at least about 0.50. Further additionally or alternately, in some aspects the fuel cell can be operated to have a temperature rise between anode input and anode output of about 40° C. or less, such as about 20° C. or less, or about 10° C. or less. Still further additionally or alternately, the fuel cell can be operated to have an anode outlet temperature that is from about 10° C. lower to about 10° C. higher than the temperature of the anode inlet. Yet further additionally or alternately, the fuel cell can be operated to have an anode inlet temperature greater than the anode outlet temperature, such as at least about 5° C. greater, or at least about 10° C. greater, or at least about 20° C. greater, or at least about 25° C. greater. Still further additionally or alternately, the fuel cell can be operated to have an anode inlet temperature greater than the anode outlet temperature by about 100° C. or less, or about 80° C. or less, or about 60° C. or less, or about 50° C. or less, or about 40° C. or less, or about 30° C. or less, or about 20° C. or less.

Operating a fuel cell with a thermal ratio of less than 1 can cause a temperature drop across the fuel cell. In some aspects, the amount of reforming and/or other endothermic reaction may be limited so that a temperature drop from the anode inlet to the anode outlet can be about 100° C. or less, such as about 80° C. or less, or about 60° C. or less, or about 50° C. or less, or about 40° C. or less, or about 30° C. or less, or about 20° C. or less. Limiting the temperature drop from the anode inlet to the anode outlet can be beneficial, for example, for maintaining a sufficient temperature to allow complete or substantially complete conversion of fuels (by reforming) in the anode. In other aspects, additional heat can be supplied to the fuel cell (such as by heat exchange or combustion of additional fuel) so that the anode inlet temperature is greater than the anode outlet temperature by less than about 100° C. or less, such as about 80° C. or less, or about 60° C. or less, or about 50° C. or less, or about 40° C. or less, or about 30° C. or less, or about 20° C. or less, due to a balancing of the heat consumed by the endothermic reaction and the additional external heat supplied to the fuel cell.

The amount of reforming can additionally or alternately be dependent on the availability of a reformable fuel. For example, if the fuel only comprised $H_2$, no reformation would occur because $H_2$ is already reformed and is not further reformable. The amount of "syngas produced" by a fuel cell can be defined as a difference in the lower heating value (LHV) value of syngas in the anode input versus an LVH value of syngas in the anode output. Syngas (sg) produced LHV (sg net)=(LHV (sg out)–LHV (sg in)), where LHV (sg in) and LHV (sg out) refer to the LHV of the syngas in the anode inlet and syngas in the anode outlet streams or flows, respectively. A fuel cell provided with a fuel containing substantial amounts of $H_2$ can be limited in the amount of potential syngas production, since the fuel contains substantial amounts of already reformed $H_2$, as opposed to containing additional reformable fuel. The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode.

An example of a method for operating a fuel cell with a reduced thermal ratio can be a method where excess reforming of fuel is performed in order to balance the generation and consumption of heat in the fuel cell and/or consume more heat than is generated. Reforming a reformable fuel to form $H_2$ and/or CO can be an endothermic process, while the anode electrochemical oxidation reaction and the cathode combustion reaction(s) can be exothermic. During conventional fuel cell operation, the amount of reforming needed to supply the feed components for fuel cell operation can typically consume less heat than the amount of heat generated by the anode oxidation reaction. For example, conventional operation at a fuel utilization of about 70% or about 75% produces a thermal ratio substantially greater than 1, such as a thermal ratio of at least about 1.4 or greater, or 1.5 or greater. As a result, the output streams for the fuel cell can be hotter than the input streams. Instead of this type of conventional operation, the amount of fuel reformed in the reforming stages associated with the anode can be increased. For example, additional fuel can be reformed so that the heat generated by the exothermic fuel cell reactions can either be (roughly) balanced by the heat consumed in reforming and/or consume more heat than is generated. This can result in a substantial excess of hydrogen relative to the amount oxidized in the anode for electrical power generation and result in a thermal ratio of about 1.0 or less, such as about 0.95 or less, or about 0.90 or less, or about 0.85 or less, or about 0.80 or less, or about 0.75 or less.

Either hydrogen or syngas can be withdrawn from the anode exhaust as a chemical energy output. Hydrogen can be used as a clean fuel without generating greenhouse gases when it is burned or combusted. Instead, for hydrogen generated by reforming of hydrocarbons (or hydrocarbonaceous compounds), the $CO_2$ will have already been "captured" in the anode loop. Additionally, hydrogen can be a valuable input for a variety of refinery processes and/or other synthesis processes. Syngas can also be a valuable input for a variety of processes. In addition to having fuel value, syngas can be used as a feedstock for producing other higher value products, such as by using syngas as an input for Fischer-Tropsch synthesis and/or methanol synthesis processes.

In some aspects, the reformable hydrogen content of reformable fuel in the input stream delivered to the anode and/or to a reforming stage associated with the anode can be at least about 50% greater than the net amount of hydrogen reacted at the anode, such as at least about 75% greater or at least about 100% greater. Additionally or alternately, the reformable hydrogen content of fuel in the input stream delivered to the anode and/or to a reforming stage associated with the anode can be at least about 50% greater than the net amount of hydrogen reacted at the anode, such as at least about 75% greater or at least about 100% greater. In various aspects, a ratio of the reformable hydrogen content of the reformable fuel in the fuel stream relative to an amount of hydrogen reacted in the anode can be at least about 1.5:1, or at least about 2.0:1, or at least about 2.5:1, or at least about 3.0:1. Additionally or alternately, the ratio of reformable hydrogen content of the reformable fuel in the fuel stream relative to the amount of hydrogen reacted in the anode can be about 20:1 or less, such as about 15:1 or less or about 10:1 or less. In one aspect, it is contemplated that less than 100% of the reformable hydrogen content in the anode inlet stream can be converted to hydrogen. For example, at least about 80% of the reformable hydrogen content in an anode inlet stream can be converted to hydrogen in the anode and/or in an associated reforming stage(s), such as at least about 85%, or at least about 90%. Additionally or alternately, the amount of reformable fuel delivered to the anode can be characterized based on the Lower Heating Value (LHV) of the reformable fuel relative to the LHV of the hydrogen oxidized in the anode. This can be referred to as a reformable fuel surplus ratio. In various aspects, the reformable fuel surplus ratio can be at least about 2.0, such as at least about 2.5, or at least about 3.0, or at least about 4.0. Additionally or alternately, the reformable fuel surplus ratio can be about 25.0 or less, such as about 20.0 or less, or about 15.0 or less, or about 10.0 or less.

EXAMPLES

In various aspects, using an elevated target electrolyte fill level for a fuel cell can provide an unexpected increase in operating voltage and an operating lifetime benefit relative to using a standard target fill level.

The unexpected increase in operating voltage can be illustrated in comparison with the voltage behavior of a molten carbonate fuel cell under standard conditions. Table 1 shows voltage values during operation at beginning of life for fuel cells operated under various conditions. The fuel cells were 250 $cm^2$ in size. The target electrolyte fill level for the fuel cells corresponded to either 56 vol % of the cathode pore volume or 80 vol % of the cathode pore volume. It is noted that a target cathode electrolyte fill level of 80 vol % corresponds to a combined target electrolyte fill level of roughly 87 vol %. The operating conditions corresponded to either conventional conditions (17 vol % $CO_2$ in cathode input flow, 75% $CO_2$ utilization) or carbon capture conditions (4 vol % $CO_2$ in cathode input flow, 90% $CO_2$ utilization).

TABLE 1

Voltage versus Target Electrolyte Fill Level

| Targeted Cathode Fill Level | Voltage (mV at 17% $CO_2$) | Voltage (mV at 4% $CO_2$) |
|---|---|---|
| 56% (standard) | 792 (5x average) | 763 |
| 80% | 783 (3x average) | 761 |

As shown in Table 1, at conventional conditions, increasing the target cathode electrolyte fill level to 80 vol % of the cathode pore volume results in a decrease in operating voltage of more than 10 mV at beginning of operation. Under carbon capture conditions, the difference in voltage between conventional target electrolyte fill and elevated target electrolyte fill is smaller, but the conventional target electrolyte fill still results in a higher operating voltage at beginning of life for a fuel cell under carbon capture conditions. Table 1 shows that at standard operating conditions, there is a clear advantage to operating with the standard target electrolyte fill level of 50 vol % to 60 vol % of the cathode pore volume. This illustrates why conventional understanding of molten carbonate fuel cells has settled on use of a standard target fill level. Additionally, even at carbon capture conditions, if only the beginning of life operating voltage is considered, it would appear that operating with a standard target fill level provides an advantage.

Figure 4:
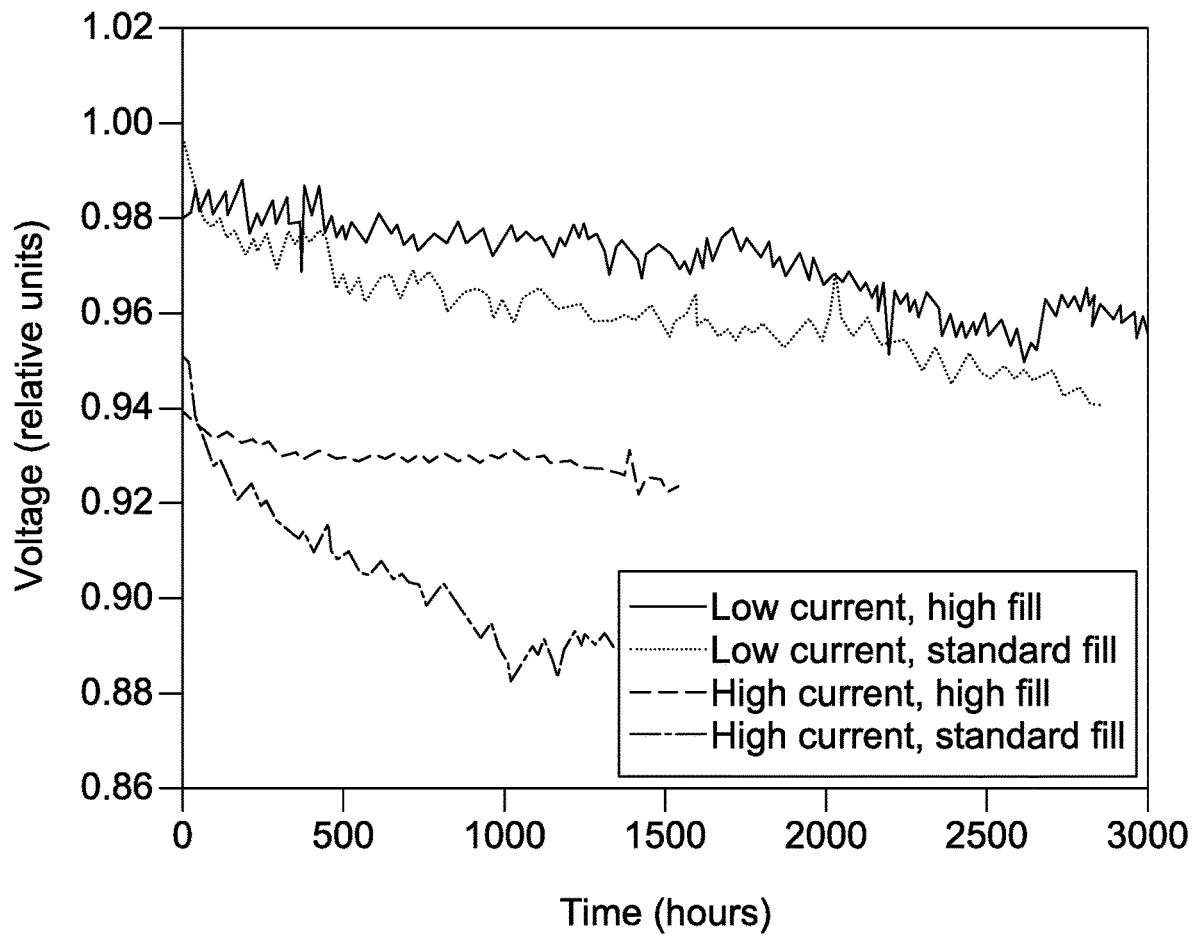
FIG. 4 shows the relative operating voltage as a function of time for molten carbonate fuel cells operated under carbon capture conditions with varying levels of target electrolyte fill in the cathode.

In contrast to Table 1, FIG. 4 shows the voltage behavior of molten carbonate fuel cells operated under carbon capture conditions over a period of time. To generate the data shown in FIG. 4, molten carbonate fuel cells were operated to generate a current density of either 120 mA/cm$^2$ or 150 mA/cm$^2$ with a cathode input flow containing between 4.0 vol % and 5.0 vol % $CO_2$ and a $CO_2$ utilization of roughly 90%. The fuel cells either had a standard target electrolyte fill level (50 vol % to 56 vol % of the cathode pore volume; roughly 63 vol % to 70 vol % combined target electrolyte fill level) or an elevated target electrolyte fill level (80 vol % or more of the cathode pore volume; roughly 87 vol % combined target electrolyte fill level).

As shown in FIG. 4, after a brief initial period, the operating voltage for the fuel cells with the elevated target electrolyte fill level was higher than the operating voltage for the fuel cells with the standard target electrolyte fill level. (The first few hours of data points for the standard target fill level at 120 mA/cm$^2$ are not shown in FIG. 4, but it is believed that the beginning of life voltage was briefly higher than the corresponding elevated target fill level.) This shows that over time, operating with a higher target fill level of electrolyte provided an unexpected operating voltage increase. This unexpected operating voltage increase was more pronounced at the higher current density of 150 mA/cm$^2$.

It is believed that the improved operating voltage when using an elevated target electrolyte fill level at carbon capture conditions is due in part to the increased loss of lithium in the fuel cell. The increased loss of lithium can be observed in several manners. One indication of the increased loss of lithium is the overall decrease in the amount of electrolyte present in a molten carbonate fuel cell after extended operation at carbon capture conditions.

Table 2 shows the relative fill level of electrolyte in various portions of a molten carbonate fuel cell after operating the fuel cell for 2500 hours at carbon capture conditions (~4.0 vol % $CO_2$ in cathode input stream, ~90% $CO_2$ utilization). The target electrolyte fill level was a standard fill level of roughly 56 vol % of the cathode pore volume and >90 vol % of the matrix volume. This corresponds to a combined target electrolyte fill level of roughly 70 vol %. The results shown in Table 2 are relative to a baseline of a fuel cell operated at conventional conditions for 2500 hours. The fill level change is based on the available pore volume in each portion of the fuel cell.

TABLE 2

Relative Electrolyte Fill Level after Operation at Carbon Capture Conditions

| Component | Relative Fill Level |
|---|---|
| Cathode | −23 vol % |
| Matrix | −5 vol % |
| Anode | −50 vol % |

Figure 5:
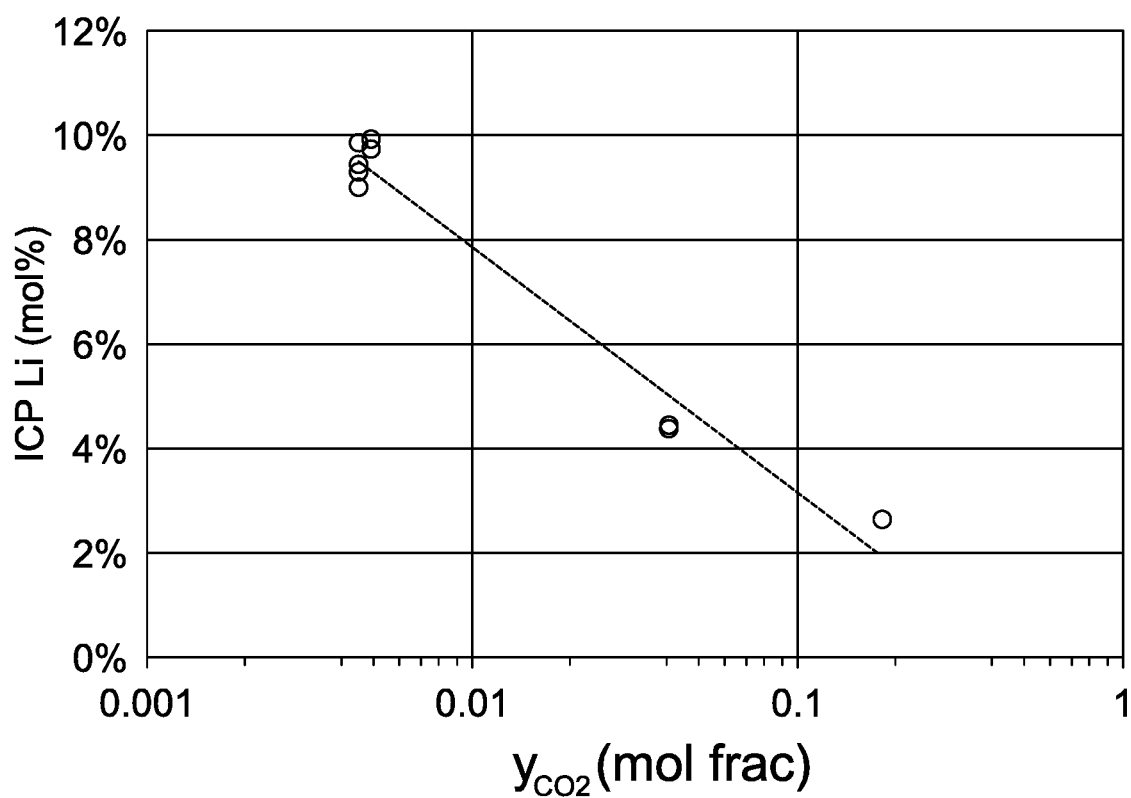
FIG. 5 shows the cathode lithium content for cathodes from molten carbonate fuel cells operated with varying levels of $CO_2$ in the cathode input stream.

The increased loss of lithium is believed to be due in part to increased incorporation of lithium into the cathode itself. This increased incorporation of lithium into the cathode is illustrated in FIG. 5. FIG. 5 shows inductively-coupled plasma mass spectrometry analysis (ICP-MS) of cathode structures after exposure in a test environment to lithium under various conditions. The cathode structures were composed of nickel oxide. The cathode structures were tested by exposing the cathode structure, an electrolyte, and a cathode collector in an out-of-cell test apparatus to an environment that simulates an oxidizing environment. Several different oxidizing environments were used. A first oxidizing environment corresponded to 0.5 vol % $CO_2$, 9 vol % $O_2$, and 10 vol % $H_2O$, with the balance being $N_2$. A second oxidizing environment corresponded to 4.1 vol % $CO_2$, 9 vol % $O_2$, and 10 vol % $H_2O$, with the balance being $N_2$. A third oxidizing environment corresponded to 18.5 vol % $CO_2$, 11.3 vol % $O_2$, 3.0 vol % $H_2O$, with the balance being $N_2$. It is noted that the third oxidizing environment corresponds to conventional molten carbonate fuel cell conditions, while the first and second oxidizing environments correspond to carbon capture conditions.

After exposure of the model fuel cell structures in the out-of-cell test apparatus to the various oxidizing environments, the composition of the cathodes was analyzed using ICP-MS to determine the lithium content. As shown in FIG. 5, exposure of a fuel cell to conventional operating conditions resulted in a cathode with a lithium content of less than 3.0 wt %. Exposure of a fuel cell to an oxidizing environment with roughly 4.0 vol % $CO_2$ resulted in a cathode with a lithium content of greater than 4.0 wt %. Exposure of a fuel to an oxidizing environment with roughly 0.5 vol % $CO_2$ resulted in a cathode with a lithium content of between 9.0 wt % and 10 wt %. Based on the results in FIG. 5, use of carbon capture conditions resulted in a substantial increase in the amount of lithium incorporated into the cathode in the out-of-cell test apparatus. A similar increase in lithium incorporation into the cathode is believed to occur during fuel cell operation.

Figure 6:
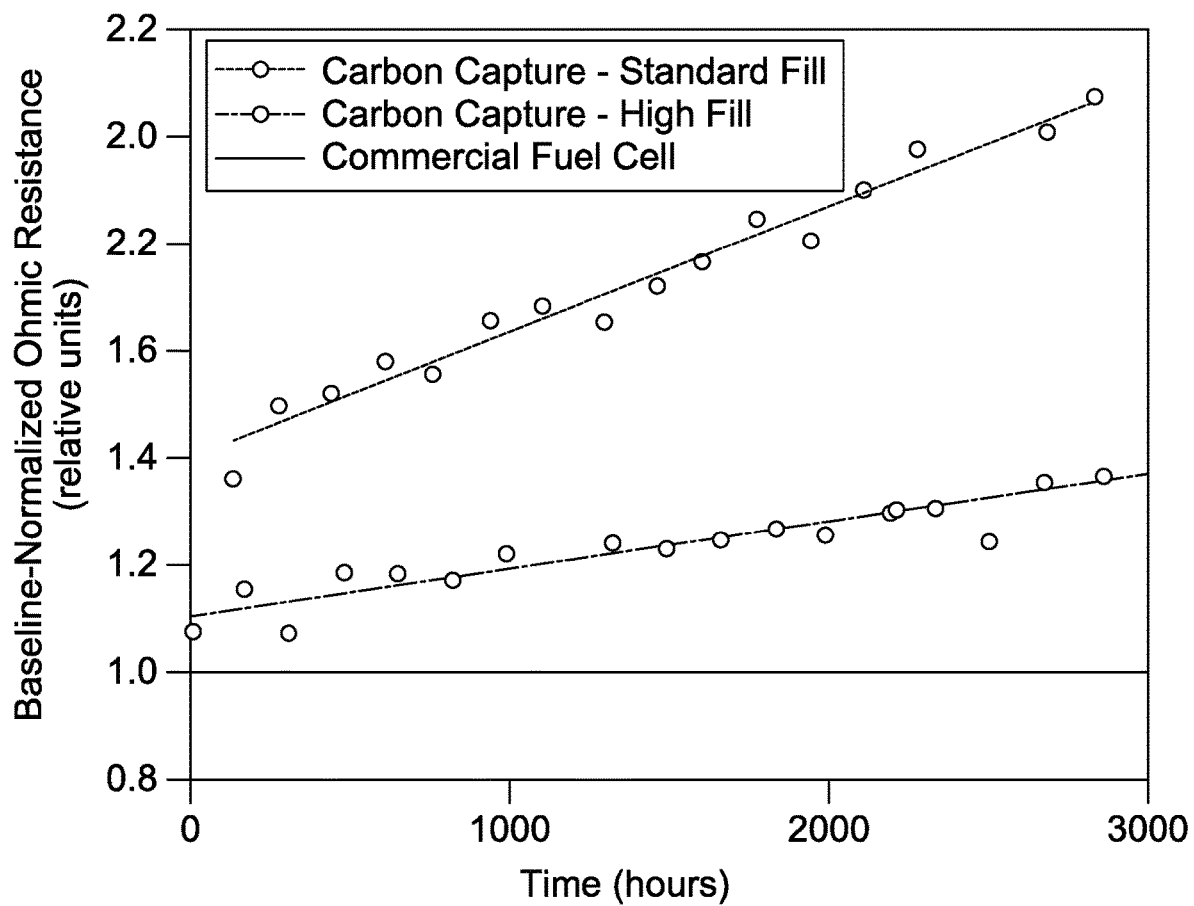
FIG. 6 shows the relative ohmic resistance for molten carbonate fuel cells operated under various conditions and with various target electrolyte fill levels in the cathode.

The modification in fuel cell behavior can also be seen in the ohmic resistance exhibited by a fuel cell when operated under various conditions. FIG. 6 shows results from measurement of ohmic resistance over time for fuel cells operated under three types of conditions. The fuel cells had a size of 6.24 in ×6.24 in (15.85 cm×15.85 cm). A first condition was operation under conventional operating conditions (~18 vol % $CO_2$ in the cathode input stream, ~75% $CO_2$ utilization) with a standard target electrolyte fill level (~56 vol % of the cathode pore volume). This was considered as a baseline condition. All of the data shown in FIG. 6 was normalized to the ohmic resistance at this baseline condition. Thus, the ohmic resistance for the baseline condition is shown as "1.0" in normalized units. A second condition corresponded to carbon capture conditions (~4.0 vol % $CO_2$ in the cathode input stream, ~90% $CO_2$ utilization) with a standard target electrolyte fill level. A third condition corresponded to carbon capture conditions with an elevated target electrolyte fill level (~80 vol % of the cathode pore volume). As shown in FIG. 6, at the carbon capture conditions, using the elevated initial electrolyte fill level substantially reduced the ohmic resistance of the fuel cell under carbon capture conditions.

ADDITIONAL EMBODIMENTS

Embodiment 1. A method for producing electricity in a molten carbonate fuel cell comprising a lithium-containing electrolyte, the method comprising: operating a molten carbonate fuel cell comprising an anode, a matrix, and a cathode with a cathode input stream comprising 10 vol % or less of $CO_2$ at an average current density of 120 mA/cm$^2$ or more and a $CO_2$ utilization of 60% or more, the molten carbonate fuel cell further comprising a combined target electrolyte fill level of 70 vol % or more of a combined matrix pore volume and cathode pore volume.

Embodiment 2. The method of Embodiment 1, wherein operating the molten carbonate fuel cell comprises operating at a measured $CO_2$ utilization of 75% or more.

Embodiment 3. A method for producing electricity in a molten carbonate fuel cell comprising a lithium-containing electrolyte, the method comprising: operating a molten carbonate fuel cell comprising an anode, a matrix, and a cathode with a cathode input stream comprising $CO_2$ at an average current density of 120 mA/cm$^2$ or more and a $CO_2$ utilization of 90% or more, the molten carbonate fuel cell further comprising a combined target electrolyte fill level of 70 vol % or more of a combined matrix pore volume and cathode pore volume.

Embodiment 4. The method of any of the above embodiments, i) wherein the cathode input stream comprises 5.0 vol % or less of $CO_2$, ii) wherein the cathode exhaust comprises 2.0 vol % or less of $CO_2$, iii) wherein the molten carbonate fuel cell is operated at a transference of 0.95 or less, or iv) a combination of two or more of i), ii), and iii).

Embodiment 5. The method of any of the above embodiments, wherein the electrolyte comprises a non-eutectic mixture, or wherein the lithium carbonate content of the electrolyte is greater than a corresponding eutectic composition by 10 wt % or more.

Embodiment 6. The method of any of the above embodiments, wherein the current density is 150 mA/cm$^2$ or more.

Embodiment 7. The method of any of the above embodiments, wherein the molten carbonate fuel cell is operated for a cumulative time of 50 hours or more.

Embodiment 8. The method of any of the above embodiments, wherein a target cathode electrolyte fill level comprises 85 vol % to 140 vol % of the cathode pore volume.

Embodiment 9. The method of any of the above embodiments, wherein the combined target electrolyte fill level is 85 vol % to 128 vol %.

Embodiment 10. The method of any of the above embodiments, wherein at least a portion of the combined target electrolyte fill level is stored in the cathode collector.

Embodiment 11. A molten carbonate fuel cell comprising: a cathode collector, a cathode, a matrix, and an anode; and a lithium-containing electrolyte, a combined target electrolyte fill level of the lithium-containing electrolyte corresponding to 85 vol % or more of a combined matrix pore volume and cathode pore volume.

Embodiment 12. The fuel cell of Embodiment 11, wherein the electrolyte comprises a lithium carbonate content that is greater than a corresponding lithium content in a corresponding eutectic mixture by 10 wt % or more.

Embodiment 13. The fuel cell of Embodiment 11 or 12, wherein at least a portion of the combined target electrolyte fill level is stored in the cathode collector.

Embodiment 14. The fuel cell of any of Embodiments 11 to 13, wherein the combined target electrolyte fill level is 90 vol % to 127 vol %.

Embodiment 15. The fuel cell of any of Embodiments 11 to 14, wherein the fuel cell comprises a target cathode electrolyte fill level of 85 vol % to 140 vol %.

Additional Embodiment A. The method of any of Embodiments 1 to 10 or the fuel cell of any of Embodiments 11 to 15, wherein the cathode pore volume is 1.5 to 2.0 times the matrix pore volume.

All numerical values within the detailed description and the claims herein are modified by "about" or "approximately" the indicated value, and take into account experimental error and variations that would be expected by a person having ordinary skill in the art.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A method for producing electricity in a molten carbonate fuel cell comprising a lithium-containing electrolyte, the method comprising: operating a molten carbonate fuel cell comprising an anode, a matrix, and a cathode with a cathode input stream comprising 10 vol % or less of $CO_2$ at an average current density of 120 mA/cm$^2$ or more and a $CO_2$ utilization of 60% or more, the molten carbonate fuel cell further comprising a combined target electrolyte fill level of 70 vol % or more of a combined matrix pore volume and cathode pore volume.

2. The method of claim 1, wherein operating the molten carbonate fuel cell comprises operating at a measured $CO_2$ utilization of 75% or more.

3. The method of claim 1, wherein the cathode input stream comprises 5.0 vol % or less of $CO_2$, or wherein a cathode exhaust comprises 2.0 vol % or less of $CO_2$, or wherein the molten carbonate fuel cell is operated at a transference of 0.95 or less, or a combination of two or more thereof.

4. The method of claim 1, wherein the electrolyte comprises a non-eutectic mixture, or wherein a lithium carbonate content of the electrolyte is greater than a corresponding eutectic composition by 10 wt % or more.

5. The method of claim 1, wherein the current density is 150 mA/cm$^2$ or more.

6. The method of claim 1, wherein the molten carbonate fuel cell is operated for a cumulative time of 50 hours or more.

7. The method of claim 1, wherein a target cathode electrolyte fill level comprises 85 vol % to 140 vol % of the cathode pore volume.

8. The method of claim 1, wherein the combined target electrolyte fill level is 85 vol % to 128 vol %.

9. The method of claim 1, wherein at least a portion of the electrolyte is stored in a cathode collector.

* * * * *